US012476739B2

(12) United States Patent
Chitrakar et al.

(10) Patent No.: US 12,476,739 B2
(45) Date of Patent: Nov. 18, 2025

(54) COMMUNICATION DEVICES AND COMMUNICATION METHODS FOR MULTI-BAND TRAFFIC STREAMS

(71) Applicant: Panasonic Intellectual Property Corporation of America, Torrance, CA (US)

(72) Inventors: Rojan Chitrakar, Singapore (SG); Lei Huang, Singapore (SG); Yoshio Urabe, Nara (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 487 days.

(21) Appl. No.: 17/294,330

(22) PCT Filed: Oct. 21, 2019

(86) PCT No.: PCT/SG2019/050520
§ 371 (c)(1),
(2) Date: May 14, 2021

(87) PCT Pub. No.: WO2020/112020
PCT Pub. Date: Jun. 4, 2020

(65) Prior Publication Data
US 2022/0014311 A1    Jan. 13, 2022

(30) Foreign Application Priority Data

Nov. 30, 2018    (SG)  ............................ 10201810792S

(51) Int. Cl.
*H04L 1/1607*    (2023.01)
*H04L 1/1812*    (2023.01)
(Continued)

(52) U.S. Cl.
CPC ......... *H04L 1/1614* (2013.01); *H04L 1/1812* (2013.01); *H04L 5/0055* (2013.01); *H04W 72/1273* (2013.01); *H04W 76/15* (2018.02)

(58) Field of Classification Search
None
See application file for complete search history.

(56) References Cited

U.S. PATENT DOCUMENTS

2007/0002810 A1*  1/2007  Trainin ................. G01V 1/303
                                              370/338
2011/0261735 A1* 10/2011  Cordeiro ................ H04L 5/001
                                              370/310
(Continued)

OTHER PUBLICATIONS

International Search Report, mailed Nov. 15, 2019, for corresponding International Application No. PCT/SG2019/050520, 2 pages.
(Continued)

*Primary Examiner* — Jenkey Van
(74) *Attorney, Agent, or Firm* — Seed Intellectual Property Law Group LLP

(57) ABSTRACT

Communication devices and methods for multi-band traffic streams are provided. One exemplary embodiment provides a multi-band communication device which includes at least a plurality of transceivers and Media Access Control (MAC) circuitry. In operation, the transceivers each transmit signal frames on different ones of a plurality of frequency bands. The MAC circuitry is coupled to the transceivers and, in operation, receives a multi-band block acknowledgement frame on one of the plurality of frequency bands acknowledging the signal frames transmitted on the plurality of frequency bands. Another exemplary embodiment provides MAC circuitry which in operation generates and transmits a multi-band block acknowledgement frame on one of the plurality of frequency bands acknowledging the signal frames received on the plurality of frequency bands.

16 Claims, 25 Drawing Sheets

(51) Int. Cl.
  *H04L 5/00*      (2006.01)
  *H04W 72/1273*   (2023.01)
  *H04W 76/15*     (2018.01)

(56) References Cited

U.S. PATENT DOCUMENTS

| | | | |
|---|---|---|---|
| 2017/0006608 A1* | 1/2017 | Josiam | H04L 5/001 |
| 2017/0245203 A1* | 8/2017 | Cariou | H04W 48/14 |
| 2017/0311204 A1* | 10/2017 | Cariou | H04W 28/085 |
| 2018/0183723 A1 | 6/2018 | Cariou et al. | |
| 2018/0184233 A1* | 6/2018 | Alpert | H04L 5/001 |
| 2018/0205502 A1* | 7/2018 | Merlin | H04W 76/15 |
| 2018/0206174 A1* | 7/2018 | Zhou | H04B 1/0483 |
| 2019/0082373 A1* | 3/2019 | Patil | H04L 1/1614 |
| 2019/0297674 A1* | 9/2019 | Min | H04W 80/08 |
| 2019/0335454 A1* | 10/2019 | Huang | H04W 8/26 |
| 2019/0364555 A1* | 11/2019 | Huang | H04W 72/51 |
| 2020/0037288 A1* | 1/2020 | Huang | H04W 72/30 |
| 2020/0077417 A1* | 3/2020 | Seok | H04W 28/04 |
| 2021/0176019 A1* | 6/2021 | Wang | H04L 1/1607 |
| 2021/0409165 A1* | 12/2021 | Wang | H04L 1/1896 |
| 2022/0061051 A1* | 2/2022 | Song | H04W 72/0453 |

OTHER PUBLICATIONS

Extended European Search Report, dated Nov. 26, 2021, for European Application No. 19889834.8-1205, 10 pages.
Indian Hearing Notice dated Mar. 15, 2024, for the corresponding Indian Patent Application No. 202147021844, 2 pages.

* cited by examiner

COMMUNICATION DEVICES AND COMMUNICATION METHODS FOR MULTI-BAND TRAFFIC STREAMS

BACKGROUND

1. Technical Field

The present embodiments generally relate to communication devices, and more particularly relate to methods and devices for multi-band communication that involves multi-band traffic streams.

2. Description of the Related Art

In today's world, communication devices are expected to wirelessly operate with the same capabilities as wired computing devices. For example, a user expects to be able to seamlessly watch a high definition movie streamed to the user's wireless communication device. This presents challenges for communication devices as well as the access points to which the communication devices wirelessly connect.

The Institute of Electrical and Electronics Engineers (IEEE) 802.11 group has recently formed the Extreme High Throughput (EHT) study group to address these challenges. Multi-band operation in the 2.4 GHz, 5 GHz and 6 GHz frequency bands has been identified as a key candidate technology for such communication. Multi-channel aggregation over multiple bands is a natural way to create multi-fold increase in communication data throughput. In current IEEE 802.11 devices, when Admission Control is mandated for an Access Category (AC) by an access point (AP) (via, for example, Admission Control Mandatory (ACM) subfield(s) in an Enhanced Distributed Channel Access (EDCA) Parameter Set element), a communication device (STA) is required to set up a Traffic Stream (TS) for the AC with the AP (via an Add Traffic Stream (ADDTS) Request/Response exchange). A Block Ack agreement for the corresponding TIDs also needs to be performed (via an Add Block Ack (ADDBA) Request/Response exchange).

SUMMARY

One non-limiting and exemplary embodiment facilitates providing a multi-band communication device which includes at least a plurality of transceivers and Media Access Control (MAC) circuitry. In operation, the transceivers each transmit signal frames on different ones of a plurality of frequency bands. The MAC circuitry is coupled to the transceivers and, in operation, receives a multi-band block acknowledgement frame on one of the plurality of frequency bands acknowledging the signal frames transmitted on the plurality of frequency bands.

Another non-limiting and exemplary embodiment facilitates providing a multi-band communication device which includes the plurality of transceivers and the Media Access Control (MAC) circuitry wherein the MAC circuitry, in operation, generates and transmits a multi-band block acknowledgement frame on one of the plurality of frequency bands acknowledging the signal frames received on the plurality of frequency bands.

It should be noted that general or specific embodiments may be implemented as a system, a method, an integrated circuit, a computer program, a storage medium, or any selective combination thereof. Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with present embodiments.

Skilled artisans will appreciate that elements in the figures are illustrated for simplicity and clarity and have not necessarily been depicted to scale.

DETAILED DESCRIPTION

The following detailed description is merely exemplary in nature and is not intended to limit the embodiments or the application and uses of the embodiments. Furthermore, there is no intention to be bound by any theory presented in the preceding Background or this Detailed Description. It is recognized that existing IEEE 802.11 Traffic Stream (TS) and Block Ack (BA) mechanisms for a particular TID are restricted to a single band. It is the intent of present embodiments to present TS and BA mechanisms that operate over multiple bands in order to fully realize the throughput gains of multi-band aggregation. Furthermore, other desirable features and characteristics will become apparent from the subsequent detailed description and the appended claims, taken in conjunction with the accompanying drawings and this background of the disclosure.

Figure 1:
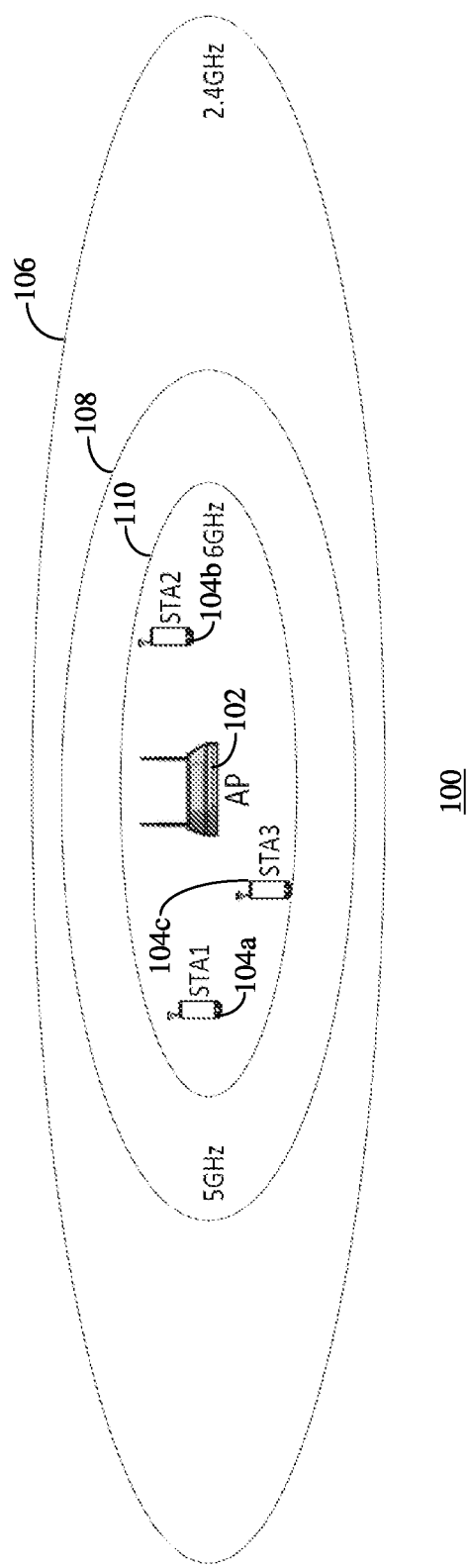
FIG. 1 depicts an illustration of an overview of an 802.11 wireless network basic service set (BSS) in accordance with present embodiments.

Referring to FIG. 1, an illustration depicts an overview of an 802.11 wireless network, also known as a basic service set (BSS), 100 which includes one redistribution point, an access point (AP) 102, and multiple communication devices (STA) 104 connected to the AP 102. Current IEEE 802.11 BSSs operate on a single frequency band with a multi-band capable AP acting as an independent AP on each frequency band. Most present 802.11 STAs are single band devices, while future 802.11 communication devices (e.g., extreme high throughput (EHT) communication devices) are expected to be capable of concurrently operating on multiple frequency bands. Such future AP 102 may setup BSSs in the 2.4 GHz frequency band, the 5 GHz frequency band, or the 6 GHz frequency band as separate BSSs as in existing 802.11 systems, in which case the STAs 104 are assumed to have joined the BSSs on three frequency bands following legacy Authentication and Association procedures. Alternatively, it may also operate a unified/virtual BSS that operates on multiple frequency bands (i.e., the 2.4 GHz frequency band 106, the 5 GHz frequency band 108, and the 6 GHz frequency band 110) as shown in the BSS 100. In this case, the STAs 104 are assumed to have joined the unified/virtual BSS 100 on all three frequency bands either through individual Authentication and Association Request/Responses on each frequency band or through multi-band Authentication and Association Request/Responses on any one of the frequency bands.

Figure 2:
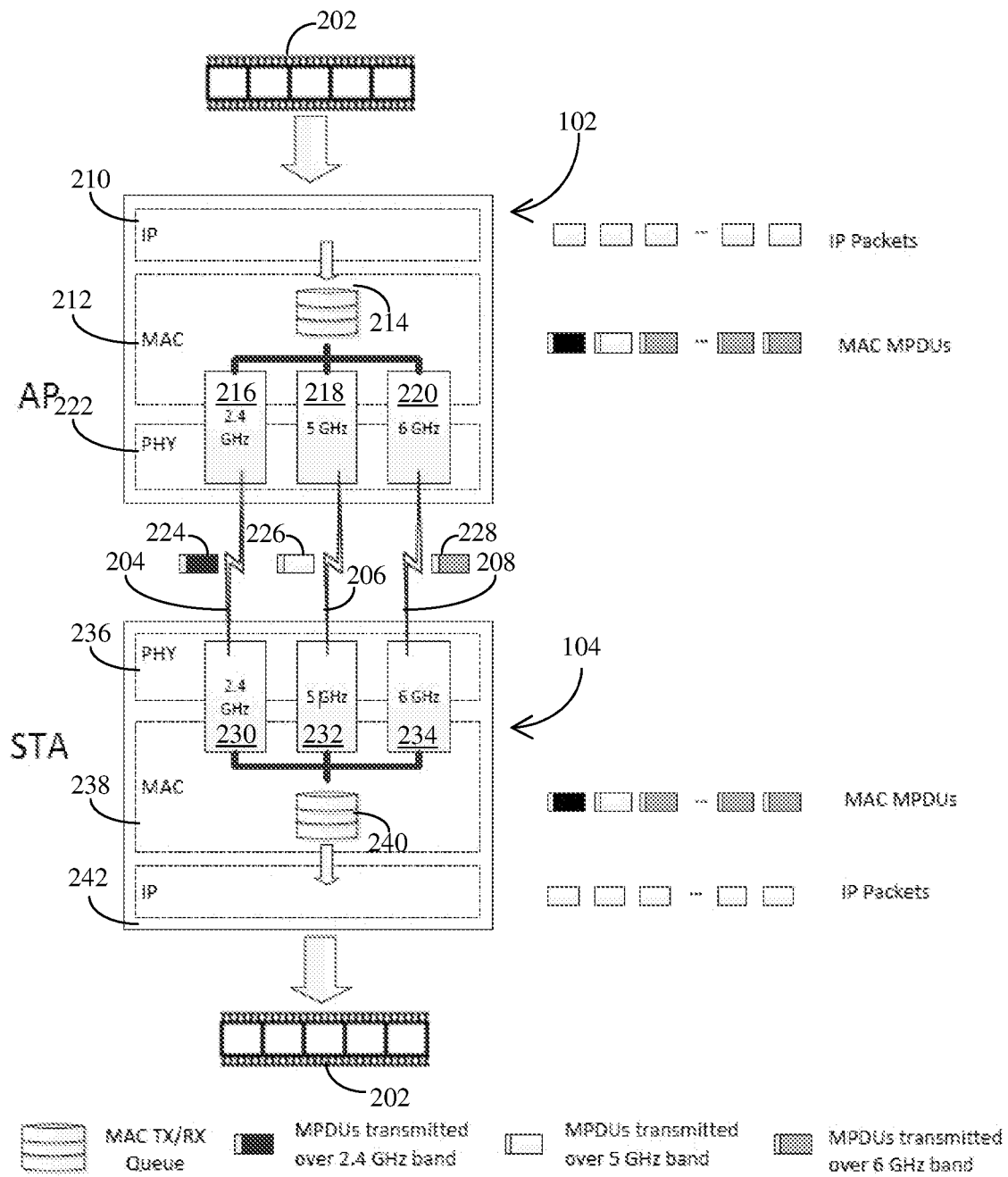
FIG. 2 depicts an illustration of communication from an access point (AP) to a communication device in accordance with present embodiments.

FIG. 2 depicts an illustration 200 of communication of a video file 202 from the AP 102 to a STA 104. In order to fully realize the throughput gains of multi-band aggregation, Traffic Stream (TS) and Block Acknowledgement (BA) mechanisms that operate over multiple bands are desired. Such multi-band TS and BA can help to achieve multiple fold increase in device throughput by enabling aggregation of traffic over multiple bands (e.g., 2.4 GHz 204, 5 GHz 206 and 6 GHz 208). Streaming of the high resolution video 202 (e.g. high definition (HD) or 4K or 8K video) may require such multi-band transmissions. At the Internet Protocol (IP) layer 210 of the AP 102, the video file 202 is split into small IP packets. The 802.11 Media Access Control (MAC) layer 212 of the AP 102 converts the IP packets into 802.11 MAC layer Protocol Data Units (MPDUs) and feeds them into a MAC TX queue 214 which in turn provides the MPDUs to transceivers 216, 218, 220 in the lower MAC layer 212 and the physical layer (PHY) 222 for simultaneous transmission on the frequency bands 2.4 GHz 204, 5 GHz 206 and 6 GHz 208, respectively. In this manner, the MPDUs 224 are transmitted over the 2.4 GHz frequency band 204, the MPDUs 226 are transmitted over the 5 GHz frequency band 206 and the MPDUs 228 are transmitted over the 6 GHz frequency band 208 to the recipient device, STA 104.

At the recipient device, the MPDUs 224, 226, 228 are received by transceivers 230, 232, 234 in the PHY layer 236 and the lower MAC layer 238. The MPDUs 224, 226, 228 are collected by the MAC layer 238 and re-ordered if necessary before being passed to the MAC RX queue 240 and up to the IP layer 242 where the IP packets are combined to form back the original video file 202.

In current 802.11 communication devices, Admission Control is usually mandated to maintain Quality of Service (QoS) levels for high priority traffic such as video (AC_VO) or voice (AC_VI). When Admission Control is mandated for an Access Category (AC) by the AP (e.g., via an Admission Control Mandatory (ACM) subfield in the Enhanced Distributed Channel Access (EDCA) parameter Set element), a STA is required to set up a TS for the Access Category (AC) with the AP via an Add Traffic Stream (ADDTS) Request/Response exchange. A Traffic Specification (TSPEC) element in the ADDTS Request frame and the ADDTS Response frame specifies the various parameters related to the TS including Traffic Stream Identifier (TSID), direction, MSDU size, minimum and maximum interval range, and minimum, mean and peak data rates, etc.

Block Ack agreement for corresponding TIDs also needs to be performed via an Add Block Ack (ADDBA) Request/Response exchange. Traffic Stream and Block Ack agreements may also be setup for a different frequency band by including a multi-band element in the ADDTS and ADDBA Request/Response exchange respectively or via On-channel Tunneling (OCT).

Since the unmanaged addition of new high priority traffic to a wireless network may have adverse effect on the QoS of existing traffic, APs usually mandate Admission Control for such traffic. In the event that there is a high volume of existing traffic, the AP may refuse a STA's request to set up Traffic Streams for that Access Category (AC).

Figure 3:
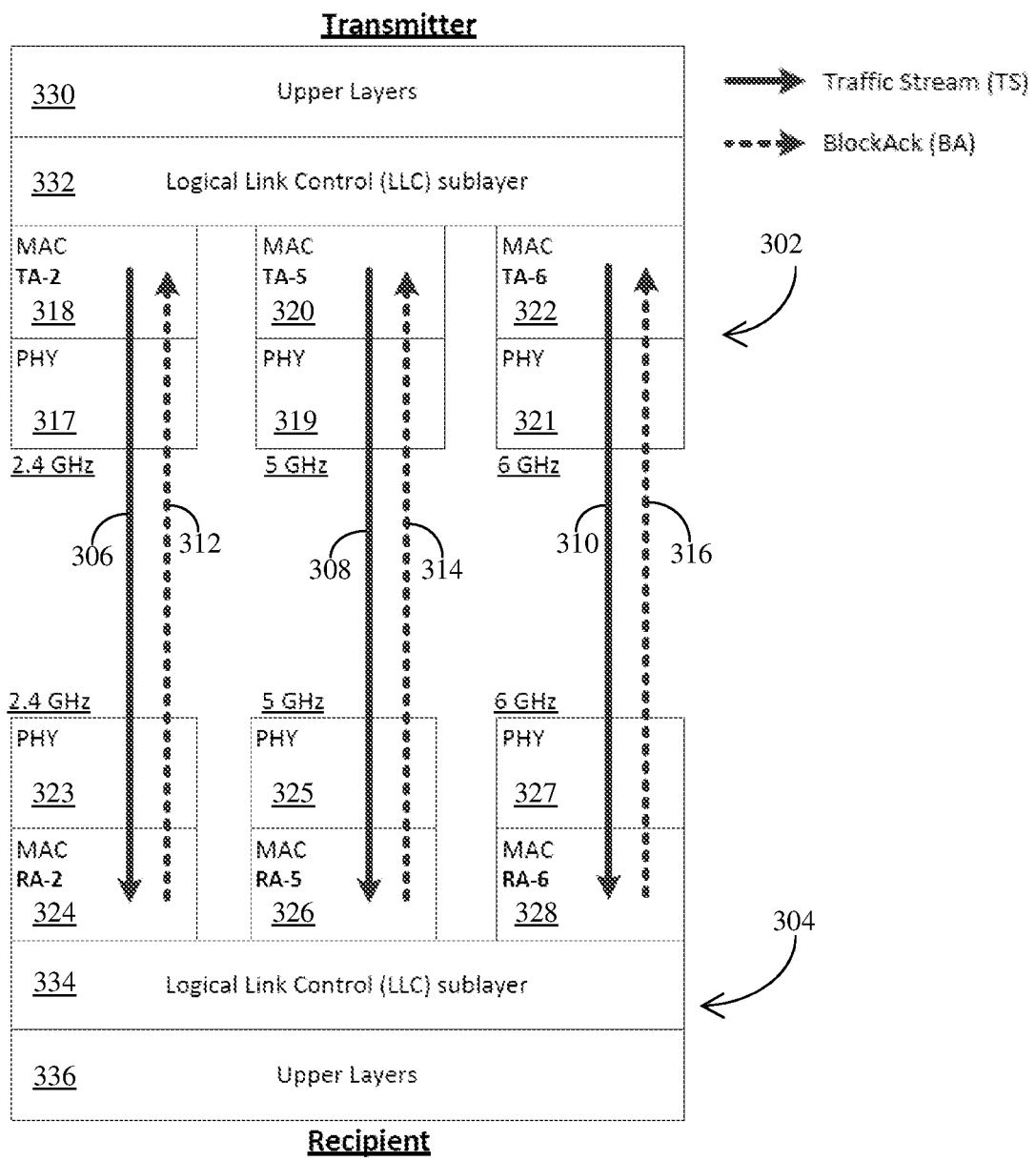
FIG. 3 depicts an illustration of setup of Traffic Stream (TS) and Block Ack (BA) agreements for a traffic identifier (TID) in accordance with present embodiments.

In order to achieve multi-band transmission in accordance with present embodiments, changes to the TS and BA operation will be required since present TS and BA setup is set up between the MAC layers on a particular band. Referring to FIG. 3, an illustration 300 depicts Traffic Stream (TS) and Block Ack (BA) agreements for a traffic identifier (TID) which are set up between a transmitter (TX) communication device 302 and a recipient (RX) communication device 304 in accordance with the present embodiment. TS and BA agreements are usually setup up as a pair with the BA agreement being setup in opposite direction to the TS direction. The TSs 306, 308, 310 are set up between TX MAC layers 318, 320, 322 of each band and corresponding RX MAC layers 324, 326, 328 of each band for data transmission from the transmitter 302 to the recipient 304, while the BA agreements 312, 314, 316 are set up in opposite directions between the RX MAC layers 324, 326, 328 and the TX MAC layers 318, 320, 322 for the transmission of BAs from the Recipient to the Transmitter to acknowledge the data transmissions corresponding to the TSs 306, 308, 310, respectively.

At the transmitter end, TX Upper Layers 330 and a TX Logical Link Control (LLC) layer 332 make decisions of which band to use for transmission for a particular TID. MPDUs of each TS 306, 308, 310 are generated at the TX MAC layers of each band (MAC layers 318, 320, 322) and addressed to the peer RX MAC layers of the same band (MAC layers 324, 326, 328). At the receiving end, re-ordering of MAC Service Data Units (MSDUs) received over different bands are done by the RX LLC layer 334 and passed to RX Upper Layers 336. Block Acks (BA) corresponding to the MPDUs of each TS 306, 308, 310 are generated at the RX MAC layers of the same band (MAC layers 324, 326, 328) and addressed to the peer TX MAC layers of each band (MAC layers 318, 320, 322). When a BA is not received or MPDUs are not acknowledged in a BA bitmap (the bits corresponding to the MPDUs set to 0), it is determined that transmission has failed for the unacknowledged MPDUs. MAC layer re-transmission of the unacknowledged MPDUs occurs in the same frequency band (2.4 GHz, 5 GHz, 6 GHz) as the failed transmission as shown in FIG. 4.

Figure 4:
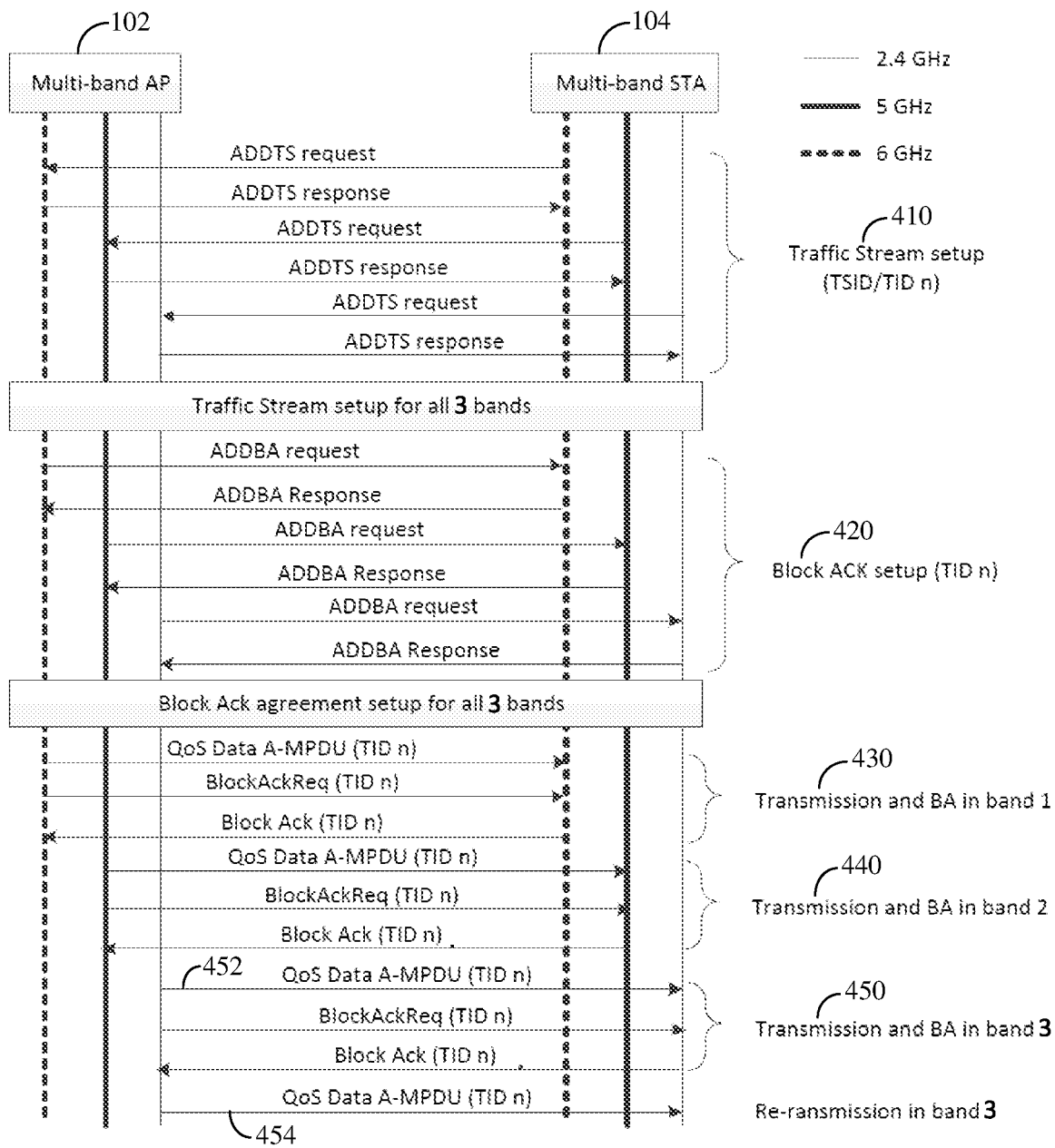
FIG. 4 depicts communication flow between the multi-band AP 102 and the multi-band STA 104 for TS and BA setup over multiple bands and communication thereafter in accordance with current multi-band communication.

FIG. 4 depicts communication flow 400 between the multi-band AP 102 and the multi-band STA 104 for TS and BA setup and communication thereafter in accordance with current multi-band communication. If the EDCA parameter Set element received in beacon frames in any band has the Admission Control Mandatory (ACM) bit set for any Access Category (AC), a STA is required to set up a Traffic Stream (TS) with the AP for the corresponding TID(s) prior to transmitting a data frame belonging to that TID/AC on that band. TS setup 410 for a particular TID are performed individually for each band, for example for downlink data transmission (i.e., from AP to non-AP device), by exchanging ADDTS Request/Response frames on each band. ADDTS Requests are always initiated by non-AP STAs regardless of the direction of the actual data transmission. Similarly, BA setup 420 for a particular TID is performed individually for each band by exchanging ADDBA Request/Response frames on each band. The ADDBA Requests are initiated by the transmitter device for the corresponding TS (the AP in this case). Once the TS and BA have been setup in each band, the data transmissions and corresponding BA transmission can take place in each band, for example 430 in the 6 GHz band, 440 in the 5 GHz band and 450 in the 2.4 GHz band. BlockAck frames for data transmission in each band 430, 440, 450 are solicited via BlockAckReq frames and the requested BlockAck frame is transmitted on the same band. Since transmissions 430, 440 and 450 take place on different bands, they may also occur at the same time or during overlapping times, thereby achieving multi-band transmission.

When it is determined that transmission of a data frame has failed (e.g., within the data transmission 452, as indicated in the BlockAck frame), the data frame is retransmitted on the same band (e.g., retransmission 454).

Although multi-band transmissions may be achieved with this approach, the onus of the scheduling, band selection, re-transmission and other duties are left to the upper layers 330, 336 (FIG. 3), which may not have the PHY layers 317, 319, 321, 323, 325, 327 information required to make such a decision. It would be better if the multi-band transmission decisions are taken at the MAC layers 318, 320, 322, 324, 326, 328 since the MAC layer has much better information/control of the PHY layers.

Figure 5:
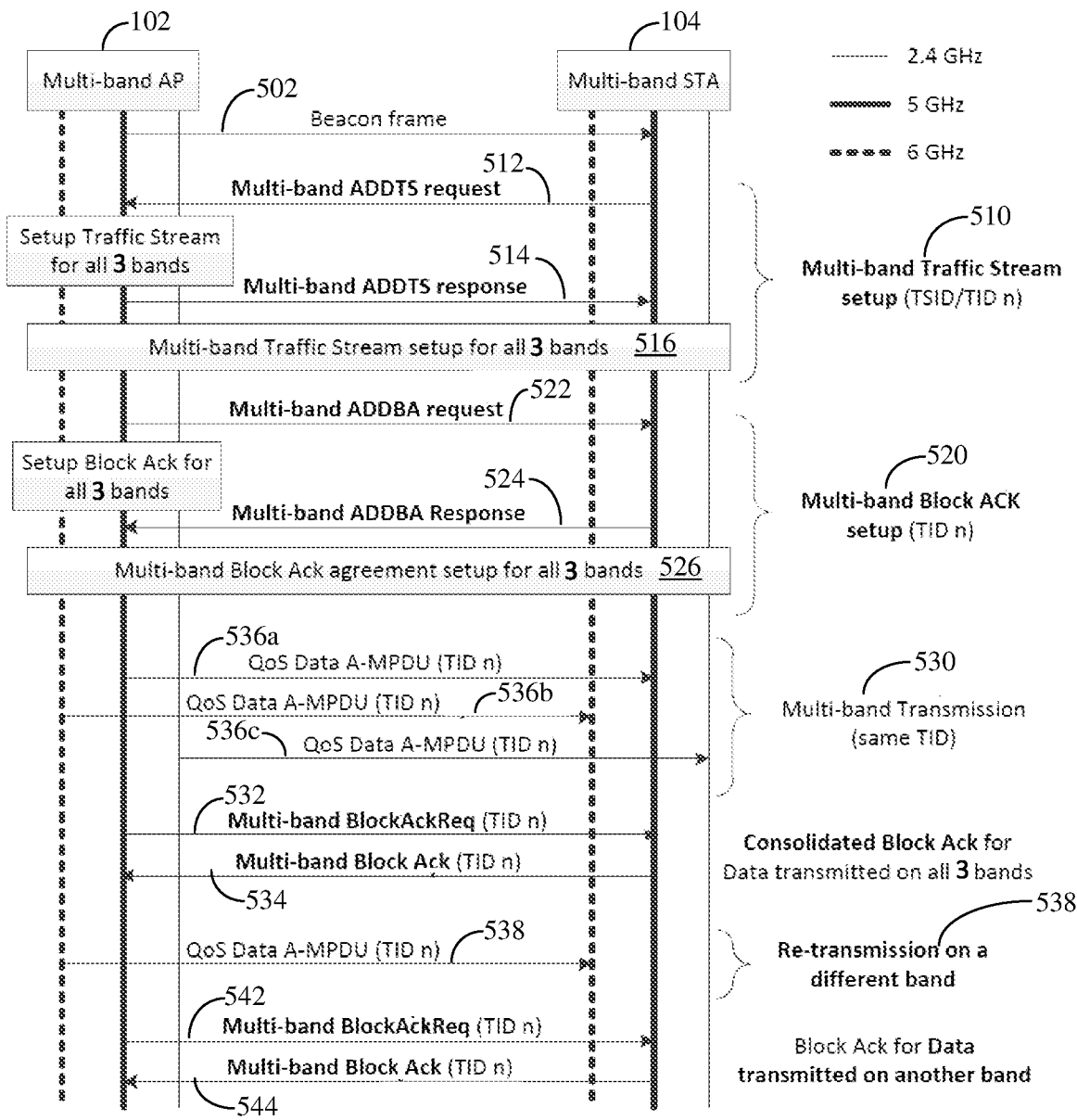
FIG. 5 depicts communication flow between the multi-band AP 102 and the multi-band STA 104 for multi-band TS and multi-band BA setup and communication thereafter in accordance with present embodiments.

FIG. 5 depicts communication flow between the multi-band AP 102 and the multi-band STA 104 for TS and BA setup and communication thereafter in accordance with present embodiments. The multi-band capable STA 104 may choose to listen to Beacon frames transmitted on a single band in order to save power. Aside from the legacy EDCA parameter Set element, the Beacon frame 502 on a primary band (e.g., the 5 GHz band) may carry a multi-band EDCA parameter Set element to indicate the EDCA parameters for a band other than the band on which the Beacon frame 502 is transmitted. If an ACM bit in the Beacon frame 502 is set to "1" for any of the AC in any of the bands, the STA 104 is required to set up a Traffic Stream (TS) for the TIDs corresponding to that AC on the indicated band(s) prior to transmitting a Data frame belonging to that TID/AC on that band(s). Alternatively, the STA 104 may also have received Beacon frames separately on each band with the legacy EDCA parameter Set element carrying the ACM bit set to "1".

Figure 10:
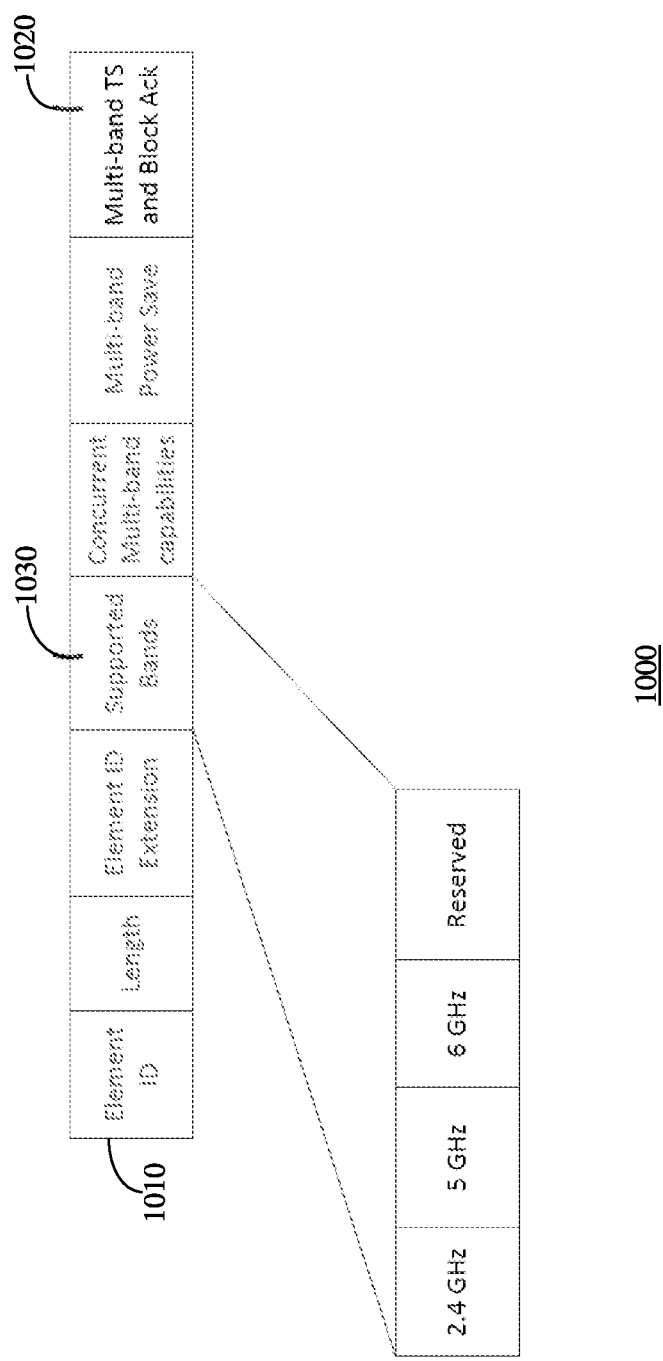
FIG. 10 depicts an illustration of a multi-band capability element in accordance with present embodiments.

If both the transmitter and recipient support multi-band TS and multi-band BA and have indicated a capability in the Multi-band TS and Block Ack field in the multi-band capability element (the multi-band capability element, including the Multi-band TS and Block Ack field, is discussed in more detail in FIG. 10), multi-band TS setup 510 (e.g. for downlink traffic) for a particular TID applicable for multi-bands (for example the three bands: 2.4 GHz, 5 GHz and 6 GHz) may be performed using a single frame exchange (e.g., on channels in the primary band) in accordance with present embodiments. Similarly, the corresponding multi-band BA setup 520 for the TID applicable for multi-bands (for example, the three bands: 2.4 GHz, 5 GHz and 6 GHz) may be performed using a single frame exchange (e.g., on channels in the primary band) in accordance with present embodiments. A Multi-band ADDTS Request frame 512 and a Multi-band ADDTS Response frame 514 are used to negotiate TS setup 516 for a TID over multiple bands. Similarly, a Multi-band ADDBA Request 522 and Multi-band ADDBA Response 524 are used to negotiate BA setup 526 for a TID over multiple bands. In this downlink traffic example, the Multi-band ADDBA Request 522 is transmitted by the AP 102 to the STA 104. If the multi-band TS setup 510 was for uplink traffic, the Multi-band ADDBA Request would be would be transmitted in the opposite direction, i.e. by the STA 104 to the AP 102.

Once the multi-band TS 516 and the multi-band BA 526 have been setup in multiple bands, the AP 102 may proceed to initiate the multi-band transmission 530 to the STA 104. The multi-band transmission 530 involves simultaneous transmission of frames belonging to the same TS (TID/AC) within the QoS Data A-MPDUs 536a, 536b and 536c, respectively, to the STA 104 over the three bands.

Upon completion of the multi-band transmission 530, the AP 102 may transmit a multi-band BlockAckReq 532 to the STA 104 on any of the bands (e.g., on the primary band) to solicit a multi-band Block Ack, acknowledging the frames 536a, 536b, 536c received on the three bands. Upon receiving the multi-band BlockAckReq 532 from the AP, the STA 104 transmits the multi-band Block Ack 534 on the same band on which the multi-band BlockAckReq 532 was received to indicate that the STA successfully received QoS Data A-MPDUs 536a and 536b but failed to receive the QoS Data A-MPDU 536c transmitted on the 2.4 GHz band. In order to improve the success rate of retransmission by using frequency diversity, the AP 102 may, in accordance with present embodiments, choose to retransmit the QoS Data A-MPDU 538 on the 6 GHz band instead of the 2.4 GHz band used for the original transmission.

The AP 102 subsequently transmits a multi-band BlockAckReq 542 to the STA 104 on a different band (e.g., on the primary band) to solicit the multi-band Block Ack 544 which carries a consolidated BA bitmap acknowledging the frames received on the 6 GHz bands. Thus, it can be seen that in accordance with the present embodiments, a Traffic Stream is setup across multiple bands using a single Multi-band ADDTS frame exchange 512, 514 on any one band. The Block Ack is also setup across multiple bands using a single Multi-band ADDBA frame exchange 522, 524 on any one band. In addition, in accordance with present embodiments, a consolidated Multi-band BlockAck frame 534 acknowledges a multi-band aggregated transmission, a multi-band BlockAck frame 544 may be used to acknowledge transmission in another band, and failed frames 536c may be re-transmitted 538 on a different band.

Thus, in accordance with present embodiments, a multi-band communication device (e.g., AP 102) includes a plurality of transceivers 216, 218, 220 which, in operation, each transmit signal frames 536c, 536a, 536b on different ones of a plurality of frequency bands 204, 206, 208. The multi-band communication device also includes Media Access Control (MAC) circuitry 212 coupled to the plurality of transceivers 216, 218, 220 which, in operation, generates a multi-band block acknowledgement request frame 532 and transmits the MAC multi-band block acknowledgement request frame 532 on the one of the plurality of frequency bands 206 to solicit the multi-band block acknowledgement frame 534. The Media Access Control (MAC) circuitry 212 subsequently receives a multi-band block acknowledgement frame 534 on one of the plurality of frequency bands 206 acknowledging the signal frames 536a, 536b, 536c transmitted on the plurality of frequency bands.

In addition, in accordance with present embodiments, a multi-band communication device (e.g., STA 104) includes a plurality of transceivers 230, 232, 234 coupled to the MAC circuitry 238. The plurality of transceivers 230, 232, 234, in operation, each receive signal frames 536a, 536b, 536c on different ones of a plurality of frequency bands 204, 206, 208. The MAC circuitry 238, in operation, upon receiving the multi-band block acknowledgement request frame 532 on one of the plurality of frequency bands 206, generates and transmits a multi-band block acknowledgement frame 534 on one of the plurality of frequency bands 206 acknowledging the signal frames 536a, 536b, 536c received on the plurality of frequency bands 204, 206, 208.

Figure 6:
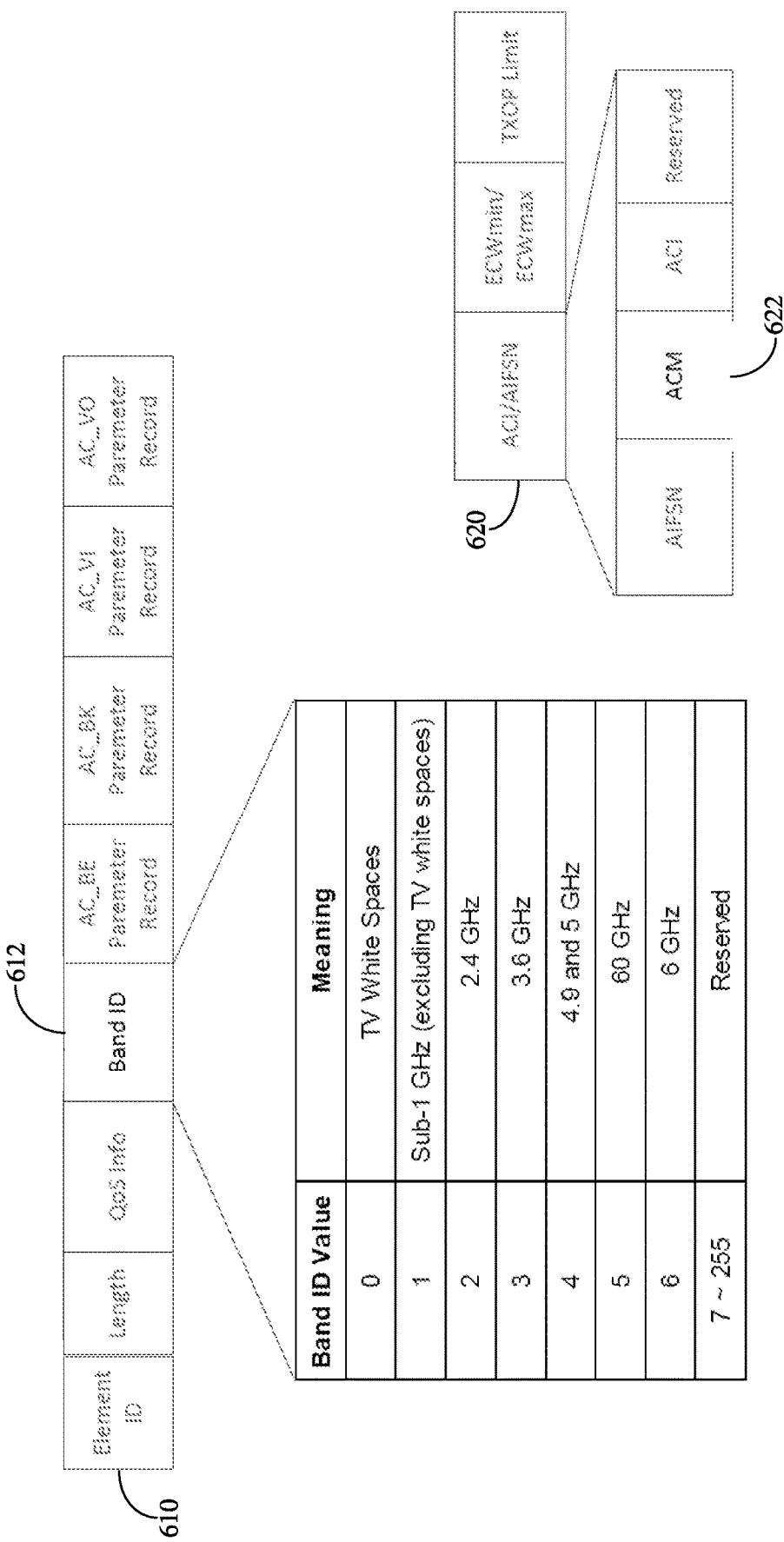
FIG. 6 depicts an illustration of a multi-band Enhanced Distributed Channel Access (EDCA) parameter set element in accordance with present embodiments.

FIG. 6 depicts an illustration 600 of a multi-band EDCA parameter set element 610 in a Beacon frame 402 (FIG. 4) in accordance with present embodiments. The multi-band EDCA parameter Set element 610 indicates the EDCA parameters for a band other than the band on which the Beacon frame 402 is transmitted. The applicable band is indicated by a Band ID field 612. A format of each of the Parameter Record field 620 for a particular AC is depicted. If the ACM bit 622 is set to "1" for any of the AC in any of the bands, a STA is required to set up a Traffic Stream (TS) for the TIDs corresponding to that AC on the indicated band prior to transmitting a Data frame belonging to that TID/AC on that band. Alternatively, the STA may also receive Beacon frames separately on each band with the legacy EDCA parameter Set element carrying the ACM bit 622 set to "1".

Figure 7:
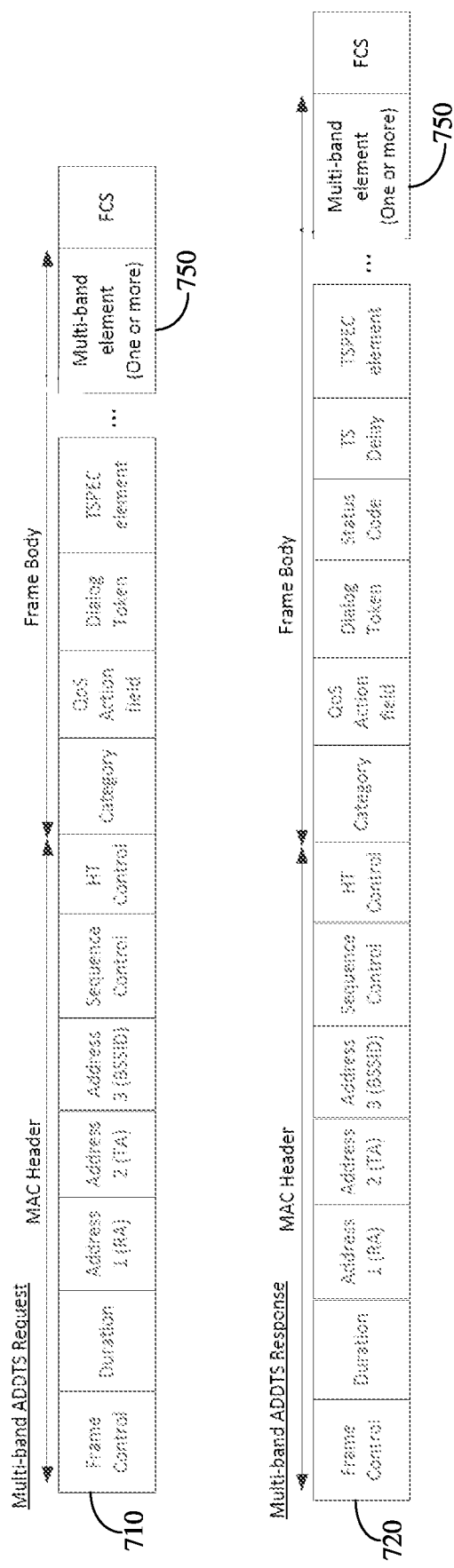
FIG. 7 depicts an illustration of a multi-band ADDTS Request frame and a multi-band ADDTS Response frame in accordance with present embodiments.
Figure 8:
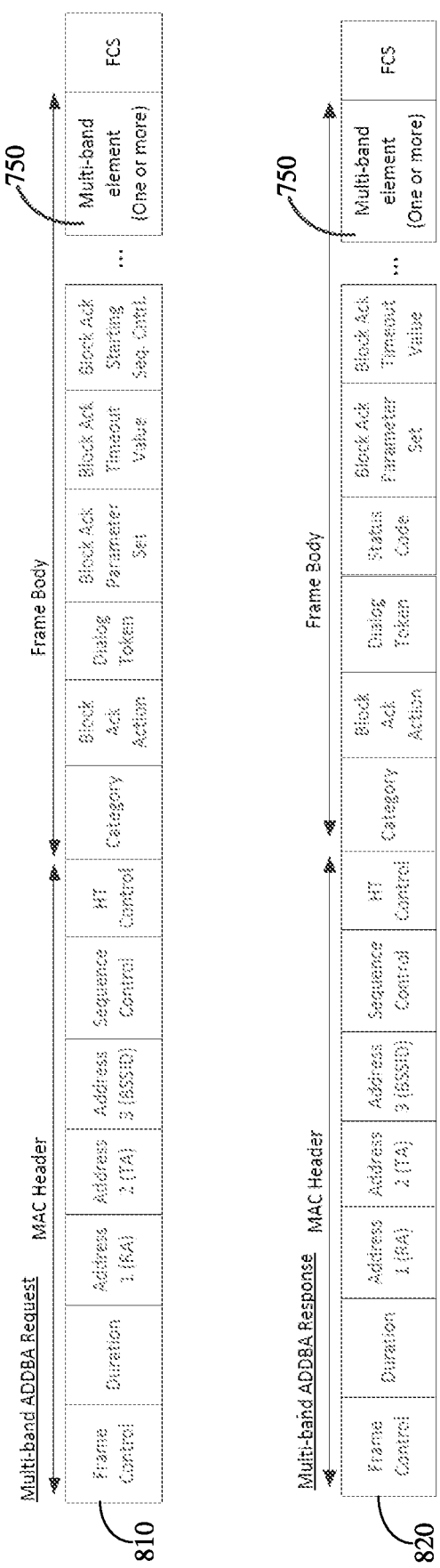
FIG. 8 depicts an illustration of a multi-band ADDBA Request frame and a multi-band ADDBA Response frame in accordance with present embodiments.

FIG. 7 depicts an illustration 700 of a multi-band ADDTS Request frame 710 and a multi-band ADDTS Response frame 720 and FIG. 8 depicts an illustration 800 of a multi-band ADDBA Request frame 810 and a multi-band ADDBA Response frame 820 in accordance with present embodiments. The multi-band ADDTS Request frame 710 and the multi-band ADDTS Response frame 720 are used to negotiate TS setup for a TID over multiple bands in response to information in one or more multi-band elements 750 in each of the multi-band ADDTS Request frame 710 and the multi-band ADDTS Response frame 720. Similarly, the multi-band ADDBA Request frame 810 and the multi-band ADDBA Response frame 820 are used to negotiate BA setup for a TID over multiple bands in response to information in one or more multi-band elements 750 in each of the multi-band ADDBA Request frame 810 and the multi-band ADDBA Response frame 820.

Figure 9:
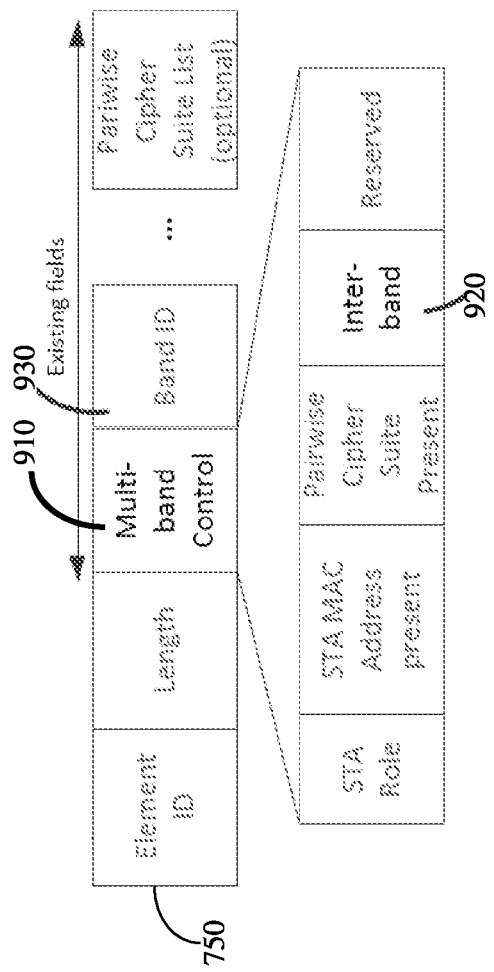
FIG. 9 depicts an illustration of a multi-band element in FIGS. 7 and 8 in accordance with present embodiments.

Referring to FIG. 9, an illustration 900 depicts the multi-band element 750 in accordance with present embodiments. The multi-band element 750 indicates the additional band (aside from the transmitted band) to which the TS or BA agreement applies. The multi-band element 750 may also include the MAC address used in the band.

The multi-band element 750 includes among other fields a Multi-band control field 910 which includes several fields including an Inter band field 920. The Inter-band field 920 is used to differentiate the multi-band element for use in Multi-band TS and BA setup. When the Inter band field 920 is set to "1", it indicates that the corresponding setup applies to the band indicated in the Band ID field 930 in addition to the band on which the frame carrying the element is transmitted. The Inter band field 920 thus serves to differentiate the inclusion of the Multi-band element 750 for multi-band ADDTS and multi-band ADDBA setup in accordance with present embodiments from the legacy usage for ADDTS and ADDBA setup on a different band.

In FIGS. 7 and 8, each of the multi-band ADDTS Request frame 710, the multi-band ADDTS Response frame 720, the multi-band ADDBA Request frame 810, and the multi-band ADDBA Response frame 820 include two multi-band elements 750 with the inter band field 920 set to "1" and the Band ID fields 930 set to 2.4 GHz in first multi-band element 750 and 6 GHz in the second multi-band element 750. Since the frames are transmitted on the 5 GHz band, this indicates a multi-band setup on the three bands.

Although in this example, the multi-band ADDBA Request 810 is transmitted by the AP 102 to the STA 104, if the multi-band TS setup 510 was for uplink traffic, the multi-band ADDBA Request would be transmitted by the STA 104 to the AP 102. Once the TS and BA have been setup in multi-band, the AP 102 can proceed to initiate the multi-band transmission 530 to the STA 104, the multi-band transmission 530 involving simultaneous transmission of frames belonging to the same TS (TID/AC) to the STA 104 over the three bands.

FIG. 10 depicts an illustration 1000 of a multi-band capability element 1010 in accordance with present embodiments. If both the transmitter and recipient support multi-band TS and multi-band BA and have indicated the capability in the Multi-band TS and Block Ack field 1020 in the multi-band capability element 1010, multi-band TS setup 510 (downlink traffic) and multi-band BA setup 520 for a particular TID applicable for multi-bands may be performed using a single frame exchange on, for example, channels in the primary band. The Multi-band TS and Block Ack field 1020 also indicates whether the AP 102 and the STA 104 support the multi-band TS and the multi-band BA feature and a Supported Bands field 1030 indicates the frequency bands supported by the AP 102 and the STA 104.

Figure 11:
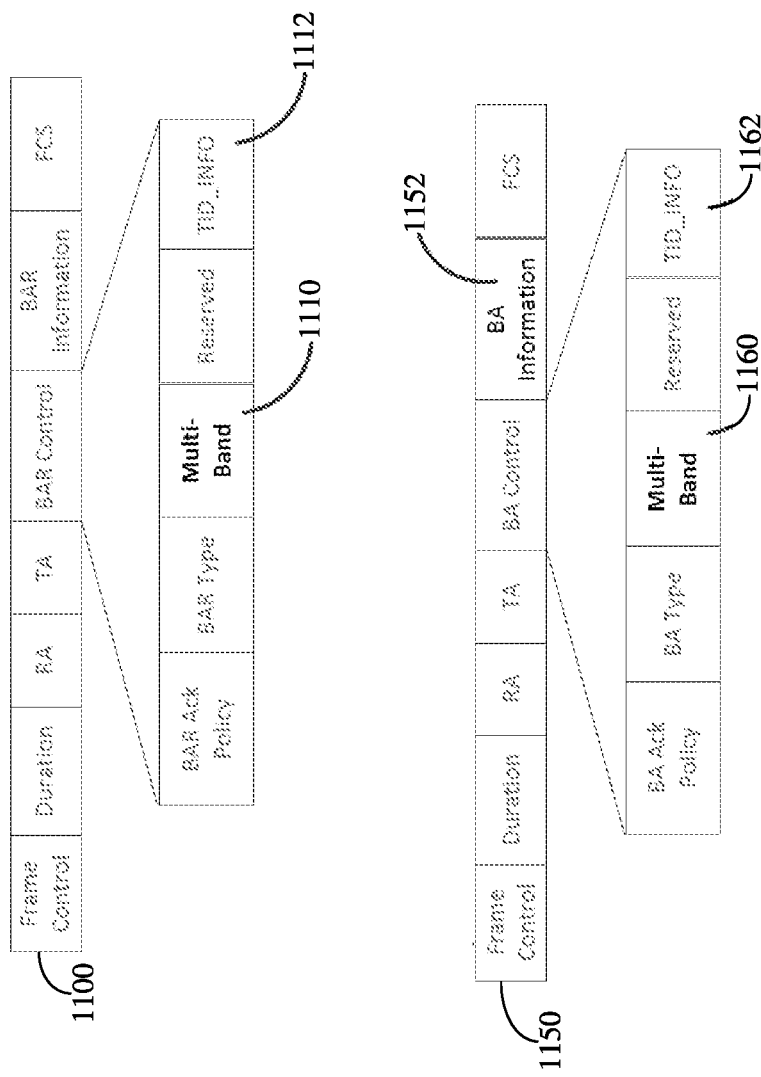
FIG. 11 depicts an illustration of a multi-band BlockAck-Req frame and a multi-band BlockAck frame in accordance with a first variant of the present embodiments.

FIG. 11 depicts an illustration of a multi-band BlockAck-Req frame 1100 and a multi-band BlockAck frame 1150 in accordance with a first variant of the present embodiments. Upon completion of the multi-band transmission 530, the AP 102 may transmit a multi-band BlockAckReq frame 1100 to the STA on any of the bands (e.g., on the primary band) to solicit a multi-band BlockAck frame 1150. The multi-band BlockAck frame 1150 includes a consolidated BA bitmap in a BA information field 1152, acknowledging the frames received on the three bands. A multi-band field 1110 and a multi-band field 1160 differentiate the multi-band BlockAckReq frame 1100 and the multi-band BlockAck frame 1150 from a prior art single band BlockAckReq frame and a prior art single band BlockAck frame, respectively.

The consolidated BA bitmap in the multi-band BlockAck frame 1150 indicates that the Recipient failed to receive the QoS Data A-MPDU 536c transmitted on the 2.4 GHz band. In order to improve the success rate of retransmission by using frequency diversity, the AP 102 may choose to retransmit the QoS Data A-MPDU 538 on the 6 GHz band instead of the 2.4 GHz band used for the original transmission.

The AP 102 subsequently transmits the multi-band BlockAckReq frame 1100 to the STA 104 on a different band (e.g., on the primary band) to solicit the multi-band BlockAck frame 1150 which carries the consolidated BA bitmap acknowledging the frames received on the 6 GHz band.

The Receiver Address (RA) and the Transmitter Address (TA) fields are set as the MAC address of the wireless radio interface of each band. However, regardless of the content of the RA and TA fields, if the Multi-band field 1110 is set to "1", the BlockAckReq frame 1100 is interpreted as soliciting a multi-band BlockAck frame acknowledging the frames belong to the TID indicated in a TID_INFO field 1112 regardless of the band on which the frames are received. Similarly, regardless of the content of the RA and TA fields, if the Multi-band fields 1160 is set to "1", the multi-band BlockAck frame 1150 carries a consolidated BA bitmap in the BA Information field 1152 acknowledging the frames belong to the TID indicated in the TID_INFO field 1162 regardless of the band on which the frames are received.

Thus, in accordance with present embodiments, traffic belonging to a same TID may be split over multiple bands. In addition, Block Acks for multiple bands may be consolidated and transmitted on another band. This capability is provided in accordance with present embodiments for the existing Block Ack Request types such as Compressed, Multi-TID, Multi-STA, and GroupCast with Retries (GCR) Block Ack Request types.

Figure 12:
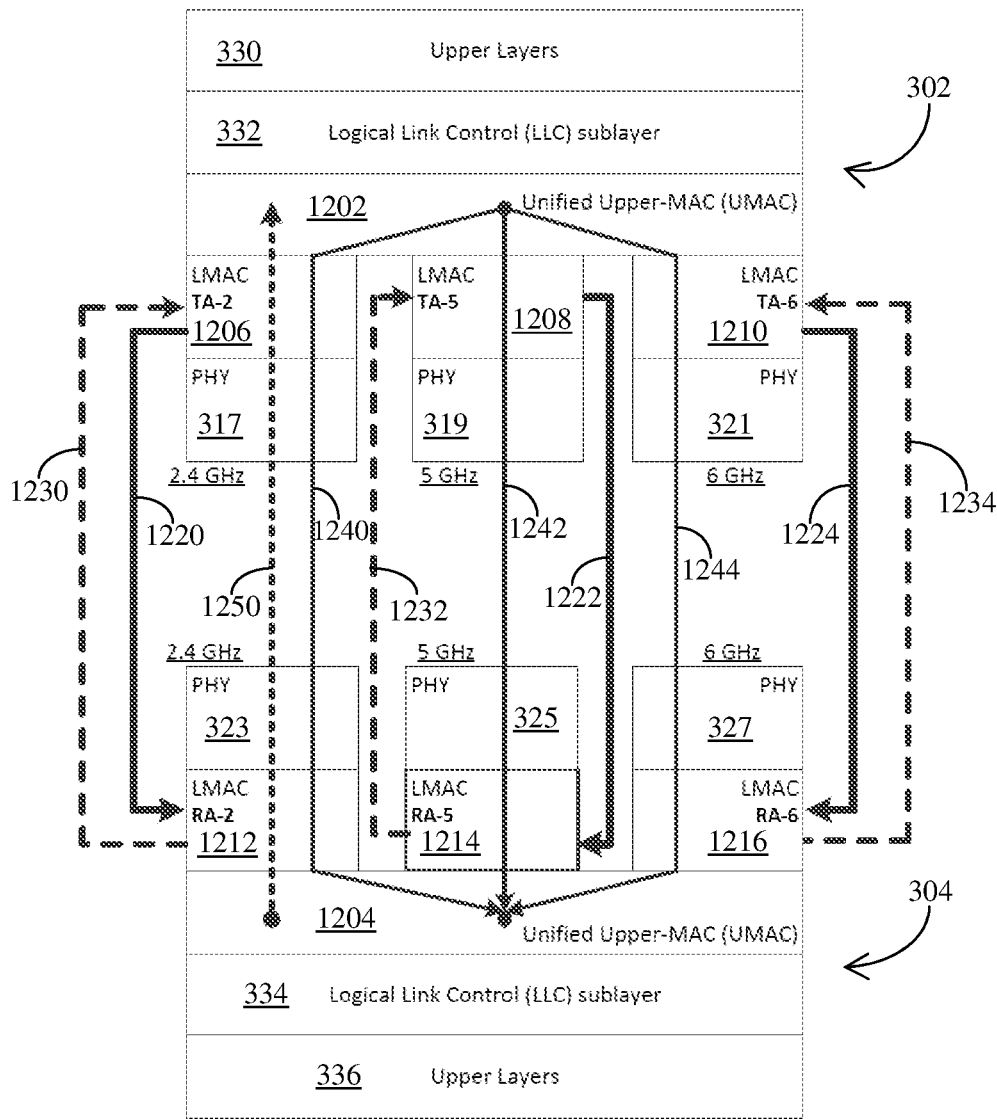
FIG. 12 depicts an illustration of a Traffic Stream and Block Ack architecture in accordance with present embodiments.

FIG. 12 depicts an illustration 1200 of a Traffic Stream and Block Ack architecture in accordance with present embodiments. The MAC layers 318, 320, 322, 324, 326, 328 are split into band-agnostic unified Upper MAC (UMAC) layers 1202, 1204 and band specific Lower MAC (LMAC) layers 1206, 1208, 1210, 1212, 1214, 1216. The Multi-band Traffic Stream agreements 1220, 1222, 1224 and the Multi-band Block Ack agreements 1230, 1232, 1234 for a TID are setup between the respective MAC layers of each band.

The Upper Layers 330, 336 and the LLC layers 332, 334 only need to deal with the unified UMAC layers 1202 and 1204 respectively. At the transmitter 302 side, the unified UMAC layer 1202 performs multi-band aggregation of the TS data (i.e., frames belonging to a particular Traffic Stream (TS) may be aggregated over different bands) over three TS data paths 1240, 1242, 1244 and makes the decision of which band(s) to use for transmissions as well as re-transmissions. The actual band used for the transmissions may be transparent to the upper layers. The recipient 304 unified UMAC 1204 is responsible for multi-band de-aggregation (i.e., re-ordering of frames belonging to a particular Traffic Stream (TS) received from different bands) and recording the reception in a consolidate Block Ack scorecard.

The recipient 304 unified UMAC 1204 is also responsible for Multi-band Block Ack generation and transmission of the Multi-band Block Ack (BA) along a Multi-band BA path 1250 on a selected frequency band (in this example, 2.4 GHz). The transmitter 302 may solicit Multi-band BA on any band by transmitting a Multi-band Block Ack Request. The recipient 304 generates and transmits the Multi-band Block Ack in response to reception of a Multi-band Block Ack Request frame or upon an implicit request to generate a multi-band BlockAck frame. The multi-band BlockAck frame is transmitted on the same band on which the respective request was received.

Figure 13:
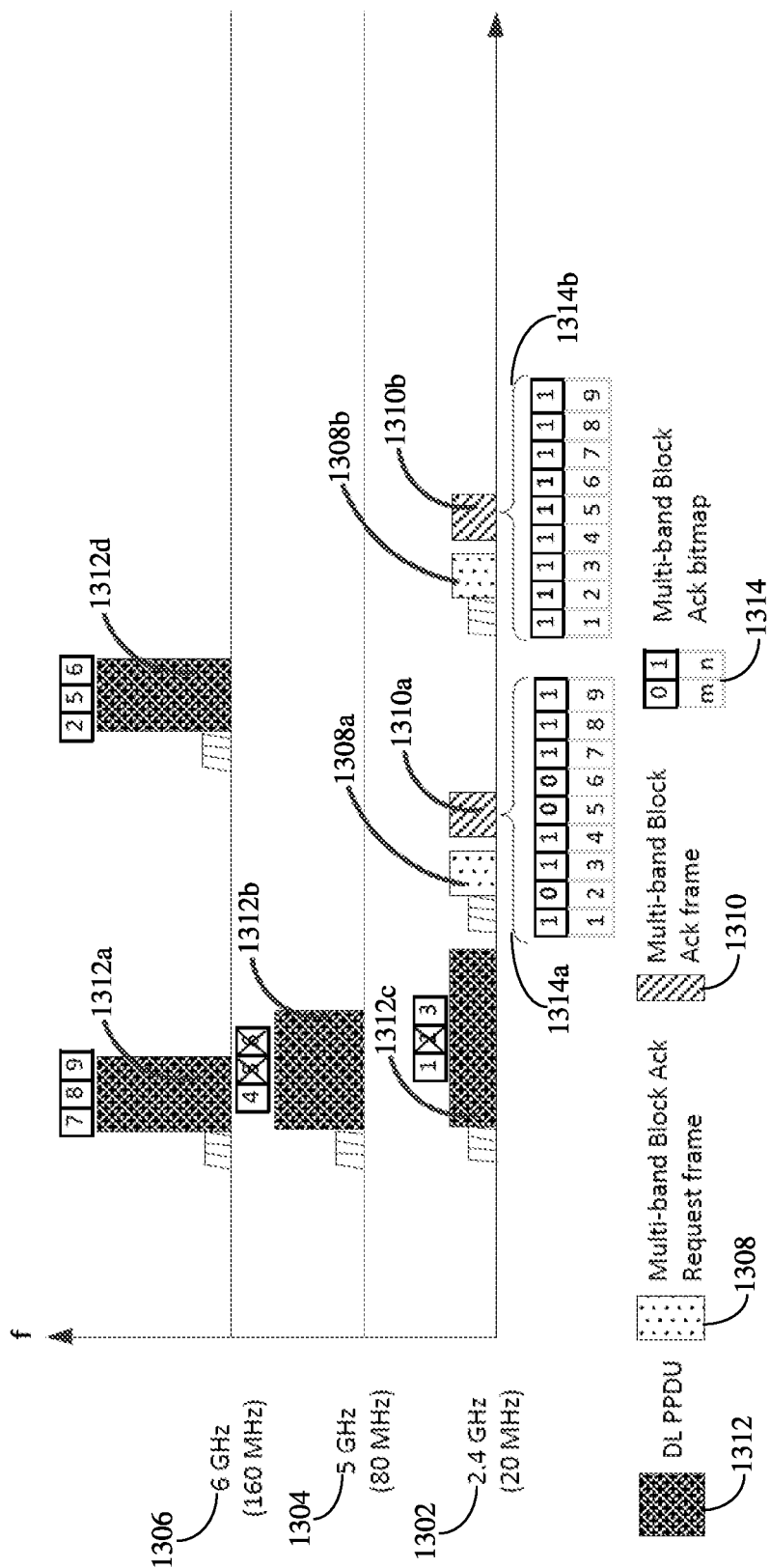
FIG. 13 depicts an illustration of a first exemplary multi-band transmission in accordance with present embodiments.

FIG. 13 depicts an illustration 1300 of a first exemplary multi-band transmission in accordance with present embodiments showing transmissions on a first frequency band 1302 (e.g. 2.4 GHz), a second frequency band 1304 (e.g. 5 GHz) and a third frequency band 1306 (e.g. 6 GHz) and assumes that the TS and BA setup for a TID has been completed on the concerned bands. The bandwidth of the channels on each band 1302, 1304, 1306 may vary depending on channel conditions and availability (e.g. 20 MHz on the 2.4 GHz band 1302, 80 MHz on the 5 GHz band 1304 and 160 MHz on the 6 GHz band 1306). Band One 1302 (e.g., the 2.4 GHz band) may be primarily used to exchange management and control frames such as the Multi-band Block Ack Request frames 1308 and the Multi-band BlockAck frames 1310 and may be known as a Primary band, while Band Two 1304 (e.g., the 5 GHz band) and Band Three 1306 (e.g., the 6 GHz band) may be primarily used to exchange Data frames 1312 (e.g., downlink (DL) PPDUs) and may be known as secondary bands or supplementary bands.

After gaining access to the channel on each band, the AP 102 initiates the multi-band transmission 1300 which is made up of downlink PPDU 1312a on Band Three 1306, downlink PPDU 1312b on Band Two 1304 and downlink PPDU 1312c on Band One 1302. Each PPDU may carry aggregated MPDUs (A-MPDU), each with a number of frames.

The AP 102 sets the Ack policy in a QoS Control field of each frame to Block Ack to indicate that there should be no immediate ack in each band and assigns the transmission of the BAR and BA on a low rate band (e.g., the 2.4 GHz band 1302) to free up the high rate bands (e.g., Band 2 1304 and Band 3 1306) for data transmissions. In addition, the same sequence number counter is used for each STA, TID pair across multiple bands to ensure that the Sequence Number (SN) of transmitted frames do not repeat across bands. In this example frames with SN 1, 2 and 3 are transmitted in the PPDU 1312c on Band One 1302, frames with SN 4, 5 and 6 are transmitted in the PPDU 1312b on Band Two 1304 and frames with SN 7, 8 and 9 are transmitted in the PPDU 1312a on Band Three 1306. The STA 104 (i.e., the Recipient) maintains a separate BlockAck Bitmap for each band at a Network Interface (NIC), but consolidates it into a single BlockAck Bitmap 1314 upon receiving a Multi-band Block-AckReq frame. The Multi-band BA frames 1310 carry the consolidated bitmaps 1314 acknowledging the frames received on the three bands—a bit set to "1" indicates successful frame reception of the frame with SN corresponding to that bit and a "0" indicates failed frame reception of the frame with SN corresponding to that bit.

In the exemplary transmission 1300, the multi-band aggregated DL PPDU frame transmission comprises frame 1312a transmitted on Band Three 1306, frame 1312b transmitted on Band Two 1304 and frame 1312c on Band One 1302 and transmission of frame with SN 2 on Band One 1302 and frames with SN 5 and 6 on Band Two 1304 fails. Upon completion of the multi-band transmission, the AP 102 transmits the Multi-band BlockAckReq frame 1308a to solicit a Multi-band BA acknowledging the frame transmitted on the three bands 1302, 1304, 1306. The Multi-band BA 1310a consolidates the BlockAck bitmaps from the three bands into the consolidated BlockAck bitmap 1314a. Bits 2, 5 and 6 corresponding to SN 2, 5 and 6 are set to "0" in the consolidated BlockAck bitmap 1314a indicating the failed reception of frames with SN 2, 5 and 6 while the rest of the bits are set to 1 to indicate successful reception. Since there were failed transmissions on Band Two 1304 and Band One 1302 but not on Band Three 1306, the AP 102 may decide that channel conditions on Band Three are better and choose to consolidate the failed frames and re-transmit them on Band Three 1306 in PPDU 1312d. Subsequently, the Multi-band BlockAckReq frame 1308b is transmitted on Band One 1302 to solicit the Multi-band BA 1310b carrying acknowledgements for the frames carried in the PPDU 1312d transmitted on Band Three 1306. This time all three re-transmitted frames are successfully received and the STA 104 transmits the Multi-band BA 1310b with the corresponding bits in the BA bitmap set to 1.

Figure 14:
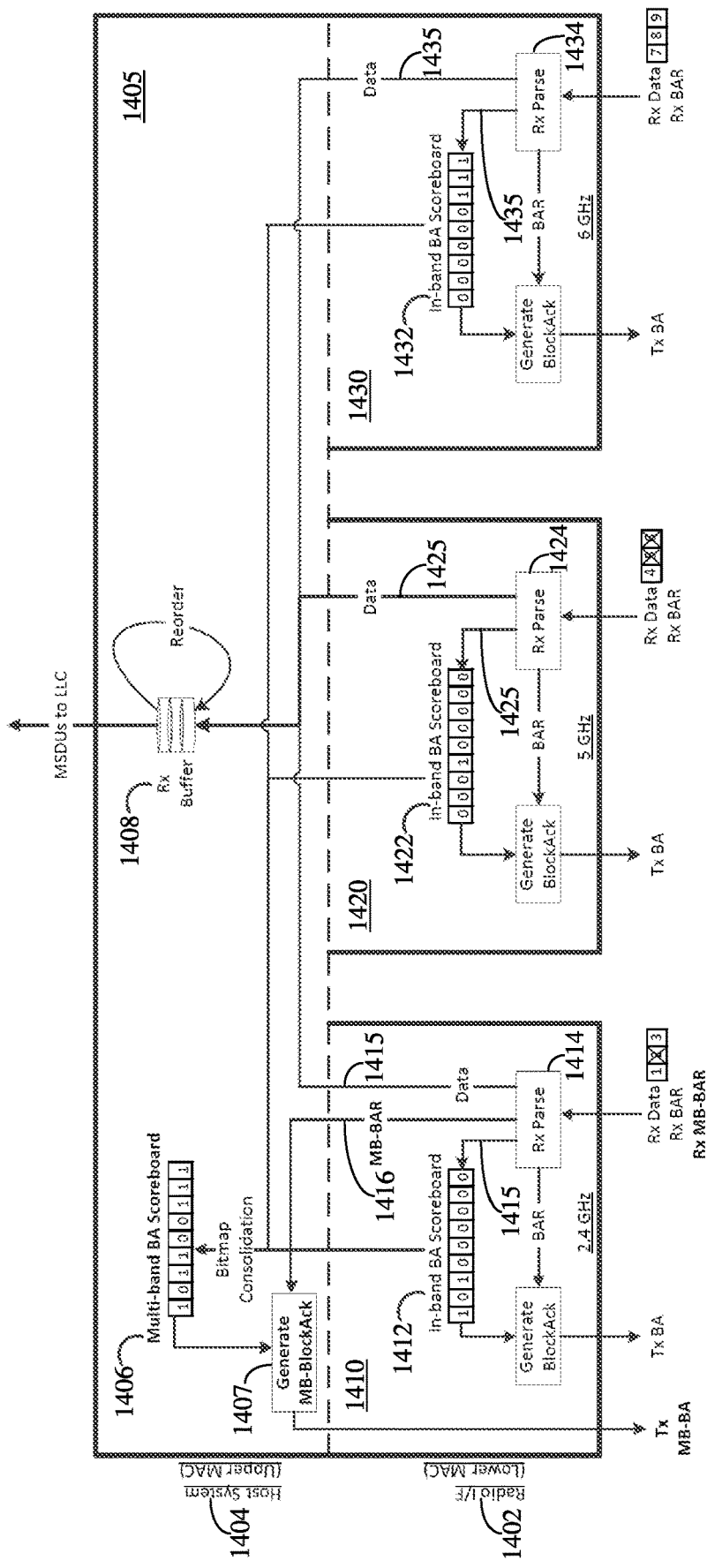
FIG. 14 depicts an illustration of an exemplary reference model for Multi-band Block Ack implementation in accordance with present embodiments.

FIG. 14 depicts an illustration 1400 of an exemplary reference model for Multi-band Block Ack implementation in accordance with present embodiments. In a wireless communication device, the Radio Interface (I/F) of each band is usually implemented as independent module (e.g., 1410, 1420, 1430 for the 2.4 GHz band, the 5 GHz band and 6 GHz band, respectively, such as the transceivers 216, 218, 220 (FIG. 2)). All of the modules 1410, 1420, 1430 are all connected to a host system 1405 which may be a CPU. The Physical Layer (PHY) modules (e.g., 317, 319, 321 (FIG. 12)) as well as time critical MAC functions in the lower MAC layers 1402 (e.g., 1206, 1208, 1210 (FIG. 12)) may be implemented on the Radio I/Fs 216, 218, 220 while the rest of the MAC functions (i.e., the upper MAC layer 1404 (e.g., 1202 (FIG. 12)) may be implemented in the host system 1405.

Due to the low latency required to produce a BA in response to a BAR (within the Short Interframe Space (SIFS) from the end of the BAR), the Block Ack scorecard for a particular band is implemented using fast but expensive on-chip memory in each radio I/F. However, maintaining the BA scorecard that persists for an entire duration of all active Block Ack sessions (known as a full state Block Ack) increases the memory requirement burden for a receiver implementation. Hence, most implementations reuse the on-chip memory for more than one Block Ack session, with the memory serving as a cache for storing the state of the most recently active Block Ack session (which is referred to as a partial state Block Ack). The In-band BA scorecards 1412, 1422, 1432 are examples of on-chip memories used as BA scorecards to record the reception status of frames received on the 2.4 GHz, 5 GHz and 6 GHz bands, respectively. Partial state Block Ack saves memory but increases the risk that the Block Ack scorecard may be overwritten by another Block Ack session in a next Transmission Opportunity (TXOP) and hence requires special handling to prevent loss of data.

To realize multi-band Block Ack operation, a Multi-band BA Scorecard 1406 is maintained in the host system 1405. Since memory on the host system 1405 is generally cheaper, the Multi-band BA Scorecard 1406 may be implemented as a full state Block Ack scorecard, i.e., the scorecard persists for the entire duration of a Multi-band Block Ack session.

In accordance with the present embodiments and as shown in the illustration 1400, the frames received in each band are parsed by the Rx Parsers 1414, 1424, 1434 and handled according to the frame type. Data frames 1415, 1425, 1435 that are correctly received and addressed to the recipient are recorded according to their sequence number (SN) in the In-band BA scorecard 1412, 1422, 1432 before being passed up to the Receive Buffer 1408. The content of the Receive Buffer 1408 may be re-ordered according to the data frame SN at regular intervals.

In conventional single band Block Ack operation, upon the completion of the TXOP (for implicit Block Ack) or upon receiving a legacy BlockAck Request (BAR) frame (for explicit Block Ack), the lower MAC copies the BA bitmap from the In-band BA scorecard and generates the BlockAck frame for immediate transmission. However, for Multi-band Block Ack operation, explicit Block Ack may be used and upon completion of the TXOP on each band, the multi-band BA scorecard 1406 is updated with the content of the In-band scorecard 1412, 1422, 1432 from the respective radio I/F. By the end of a multi-band transmission opportunity (TXOP), the multi-band BA scorecard 1406 would have consolidated the BA bitmaps of all the In-band BA scorecards 1412, 1422, 1432.

Finally, upon receiving the multi-band BAR frame 1416 on any of the bands, the upper MAC 1404 copies the BA bitmap from the multi-band BA scorecard 1406 and generates 1407 the multi-band BlockAck frame for transmission. At the same time, the reception of the multi-band BAR frame 1416 also triggers the upper MAC to reassemble the complete MSDUs from the frames in the Receive Buffer 1408 (all complete MSDUs with SN lower than the Starting Sequence Number (SSN) carried in the multi-band BAR frame 1416) and forward them in order to the upper layers. Although in the illustration 1400, the reception of the multi-band BAR frame 1416 and the transmission of the multi-band BA frame 1820 are shown in the 2.4 GHz band, it is to be understood that the process is the same for other frequency bands as well.

Figure 15:
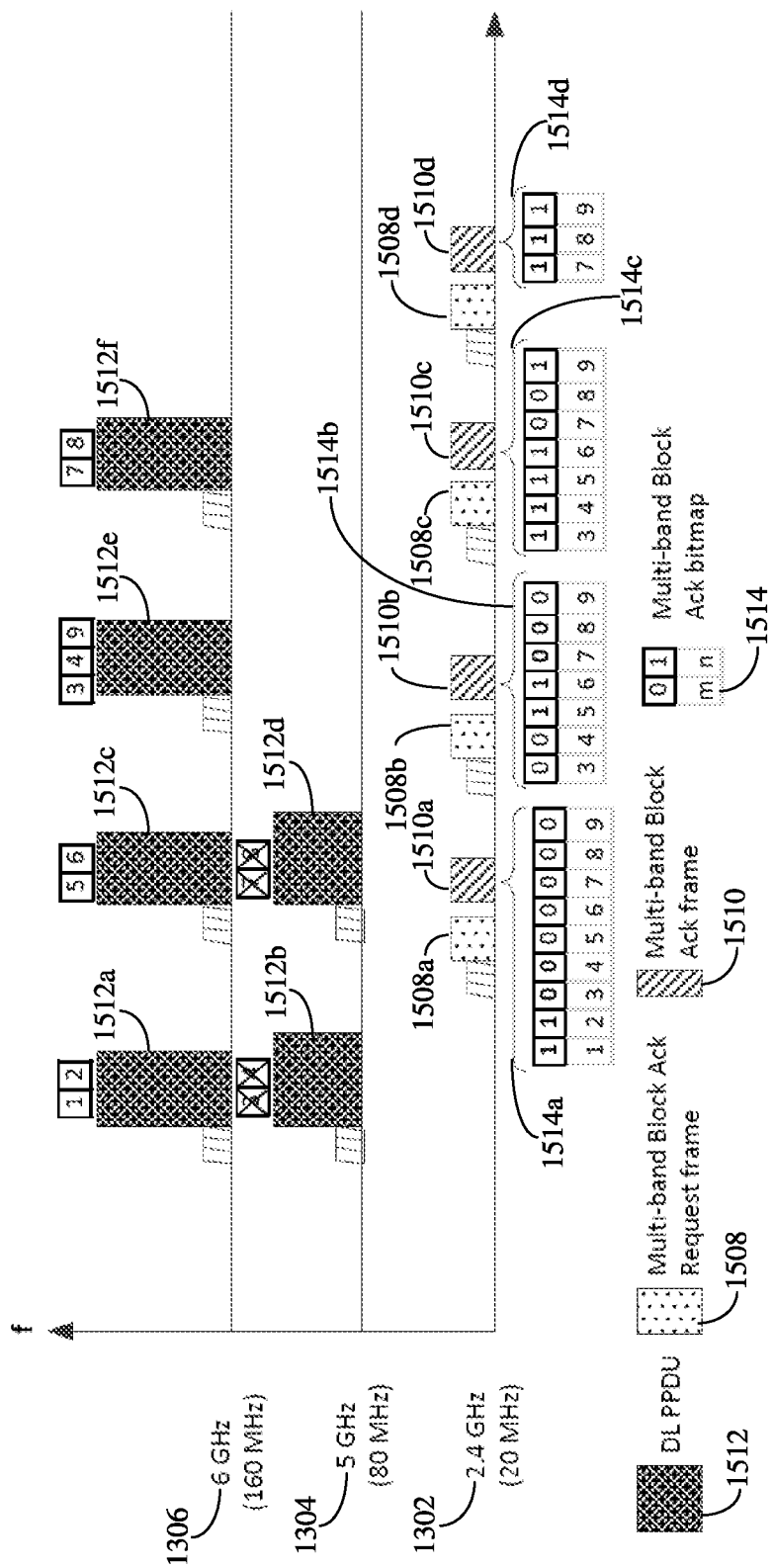
FIG. 15 depicts an illustration of a second exemplary multi-band transmission in accordance with present embodiments.

FIG. 15 depicts an illustration 1500 of a second exemplary multi-band transmission in accordance with present embodiments. This second exemplary multi-band transmission is similar to the first exemplary multi-band transmission (FIG. 13) except that this second exemplary multi-band transmission is an example of a Frequency Division Duplex (FDD) scenario where Band Two (5 GHz 1304) and Band Three (6 GHz 1306) are reserved for high bandwidth Data transmissions, while Band One (2.4 GHz 1302) is reserved for low bandwidth control frames and assumes the TS and BA setup for a TID has been completed on all concerned bands. Such kind of frequency division may result in an overall increase in system throughput due to the reduction in channel access delays in the high bandwidth frequency bands since the control frames are exclusively transmitted on the low bandwidth frequency band.

After gaining access to the channel on each band, the multi-band transmission made up of the downlink PPDU 1512*a* on Band Three 1306 and downlink PPDU 1512*b* on Band Two 1304 is initiated by AP 102. The same sequence number counter is used for each STA, TID pair across multiple bands to ensure that the Sequence Number does not repeat across bands. As with the first exemplary multi-band transmission 1300, in the second exemplary multi-band transmission 1500, the Recipient STA 104 maintains a separate BlockAck Bitmap for each band at a Network Interface (NIC), but consolidates it into a single BlockAck Bitmap 1514*a* upon receiving a Multi-band BlockAckReq frame 1508*a* on Band One 1302. A Starting Sequence Number (SSN) is included in the Multi-band BAR frames 1508*a* to indicate the first SN to be acknowledged. The SSN triggers all the frames in the receive buffer 1408 (FIG. 14) with SN lesser than the SSN to be forwarded to the upper layers. During this multi-band transmission, frames with SN 1 and 2 are received successfully by STA 104 while reception of frames with SN 3 and 4 fail. Bits 3 and 4 are set to "0" in the consolidated BlockAck bitmap 1514*a* indicating the failed reception of frames with SN 3 and 4, while bits 1 and 2 set to "1" to indicate the successful reception of frames with SN 1 and 2.

During this time, the AP 102 continues with the transmission of the multi-band aggregated DL PPDU frame transmission comprising PPDU 1512*c* transmitted on Band Three 1306 and frames PPDU 1512*d* transmitted on Band Two 1304. During this transmission, transmission of frames with SN 7 and 8 on Band 2 1304 fails. The Multi-band BlockAckReq frame 1508*b* soliciting Multi-band BA for frames transmitted on the two bands 1304 and 1306 is transmitted on Band One 1302. The Multi-band BA 1510*b* consolidates the BlockAck bitmaps from the two bands 1304 and 1306 into the consolidated BlockAck bitmap 1514*b*.

In the consolidated BlockAck bitmap 1514*b*, bits 7 and 8 are set to "0" indicating the failed reception of frames with SN 7 and 8, while bits 5 and 6 set to "1" to indicate the successful reception of frames with SN 5 and 6. Note that as successful reception of bits 1 and 2 are indicated in the consolidated BlockAck bitmap 1514*a* these bits are not represented in the consolidated BlockAck bitmap 1514*b* for brevity. Since there were failed transmissions on Band Two 1304 but not on Band Three 1306, the transmitter may choose to consolidate the failed frames with SN 3 and 4 and re-transmit them on Band Three 1306 as PPDU 1512*e*, while the failed frames with SN 7 and 8 are re-transmitted on Band Three 1306 as PPDU 1512*f*. Multi-band BlockAckReq frames 1508*c* and 1508*d* are transmitted on Band One 1502 to solicit the multi-band BAs 1510*c* and 1510*d*, respectively, carrying acknowledgements for the frames carried in the PPDUs 1512*e*, 1512*f* transmitted on Band Three 1306.

The retransmission may use Hybrid Automatic Repeat request (HARQ) retransmission instead of regular retransmission and may benefit from frequency diversity by being transmitted on a different band. The PPDUs 1512*a*, 1512*b* are acknowledged in the Multi-band BlockAck frame 1510*a*, the PPDUs 1512*c*, 1512*d* are acknowledged in the Multi-band BlockAck frame 1510*b*, the PPDU 1512*e* is acknowledged in the Multi-band BlockAck frame 1510*c*, and the PPDU 1512*f* is acknowledged in the Multi-band BlockAck frame 1510*d*. Instead of re-transmitting exact copies of the failed frames with SN 3, 4, 7 and 8, the transmitter may choose to perform a HARQ retransmission of the failed frames (either as Chase Combing or Incremental Redundancy). Since the failed frames are re-transmitted on a different frequency band as compared to the original transmission, the HARQ retransmission may achieve further gains due to frequency diversity.

Figure 16:
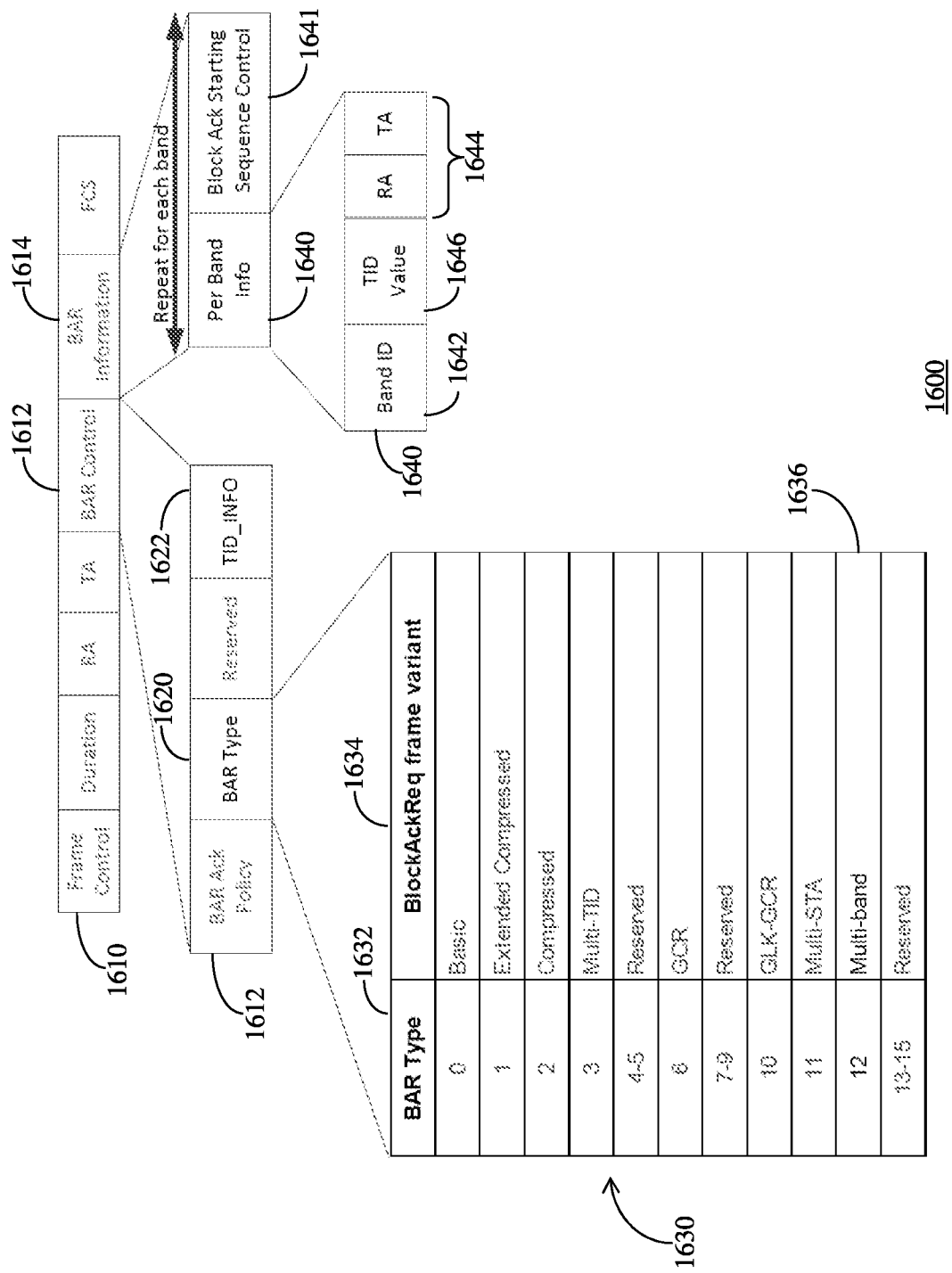
FIG. 16 depicts an illustration of a multi-band BlockAck-Req frame wherein a Multi-band frame variant type is defined in accordance with the present embodiments.

FIG. 16 depicts an illustration 1600 of a multi-band BlockAckReq frame 1610 in accordance with the present embodiments wherein a Multi-band frame variant type is defined in accordance with the present embodiments. Upon completion of the multi-band transmission 530, a multi-band BlockAckReq frame 1600 is transmitted to solicit a multi-band BlockAck frame and includes a BAR Control field 1612 and a BAR Information field 1614.

The BAR Control field 1612 includes, among other fields, a BAR Type field 1620 and a TID_INFO field 1622. The TID_INFO field 1622 indicates a number of bands present in the BAR (TID_INFO+1). A table 1630 shows BAR types 1632 which can be indicated in the BAR Type field 1620 and corresponding BAR frame variants 1634 such as Compressed, Multi-TID, Multi-STA, and GCR BAR types. In accordance with the present embodiments, a BAR Type 1636 is defined for a multi-band BAR. Similarly, a corresponding new BA Type is defined for a multi-band BA. The format is more flexible and may be used to solicit BA per a specific band, a specific TID and a specific BA Starting Sequence Control (which may be different in each band).

In accordance with present embodiments, the BAR Information field 1614 includes a Per Band Info field 1640 and a Block Ack Starting Sequence Control field 1641 for each frequency band for which acknowledgement is solicited by the multi-band BlockAckReq frame 1610. The Per Band Info field 1640 carries information specific to a frequency band; the frequency band is identified by the Band ID field 1642, which may follow the same encoding as the Band ID field 612 in FIG. 6, the Receiver Address (RA) and the Transmitter Address (TA) fields 1644 are optionally present if different MAC addresses are used for different bands and can specify the RA and TA for each band and a TID Value field 1646 identifies the TID for which the Block Ack is solicited in that band. The RA and TA fields 1644 may be omitted in the Band Info field 1640 for the band in which the BAR is transmitted.

Figure 17:
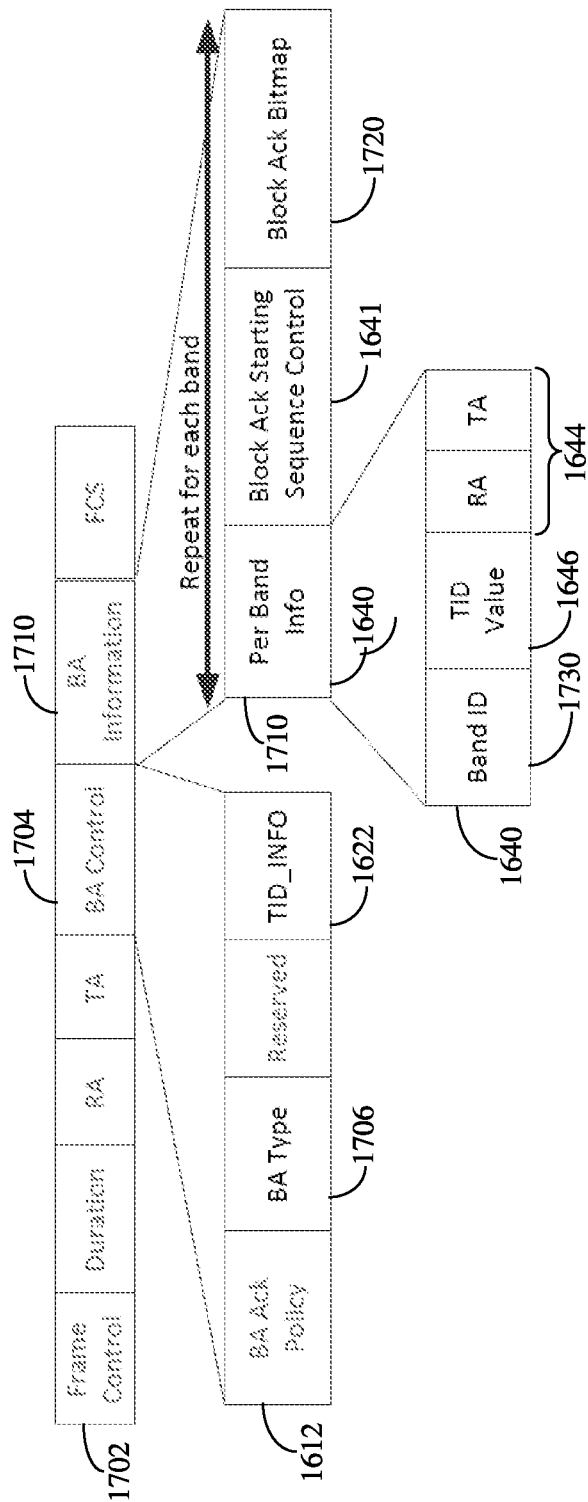
FIG. 17 depicts an illustration of a multi-band BlockAck frame wherein a variant of the BA Information field is defined in accordance with the present embodiments.

FIG. 17 depicts an illustration 1700 of a multi-band BlockAck frame 1702 wherein a variant of the BA Information field 1710 is defined in accordance with the present embodiments. The multi-band BlockAckReq frame 1702 is transmitted in response to a multi-band BlockAckReq frame 1600 and includes a BA Control field 1704 and a BAR Information field 1710. The multi-band BlockAckReq frame 1702 is identified by the BA Type field 1706 set to "Multi-Band" 1636 and may be used to return Block Ack per a specific band, a specific TID and a specific BA starting sequence control which, in each band, may be different. The BA Information field 1710 not only includes a Per Band Info field 1640 for each frequency band, but also includes a Block Ack Starting Sequence Control field 1641 and a Block Ack Bitmap 1720 for each frequency band, the frequency band being identified by the Band ID field 1730. The Receiver Address (RA) and the Transmitter Address (TA) fields 1644 are optionally present if different MAC addresses are used for different bands and can specify the RA and TA for each band and a TID Value field 1646 identifies the TID for which the Block Ack is reported in that band. The RA and TA fields 1644 may be omitted in the Per Band Info field 1640 for the band in which the BAR is transmitted. The Block Ack Bitmap 1720 for each band only acknowledges the frames received on the band identified by the Band ID field 1730 in the Per Band Info field 1640. Hence, if frames received on three frequency bands are to be acknowledged, the multi-band BlockAck frame 1702 carries three Block Ack bitmap fields 1720, one per frequency band. The transmitter may consolidate the band specific bitmaps into a single bitmap upon receiving a Multi-band BlockAck frame 1702.

Figure 18:
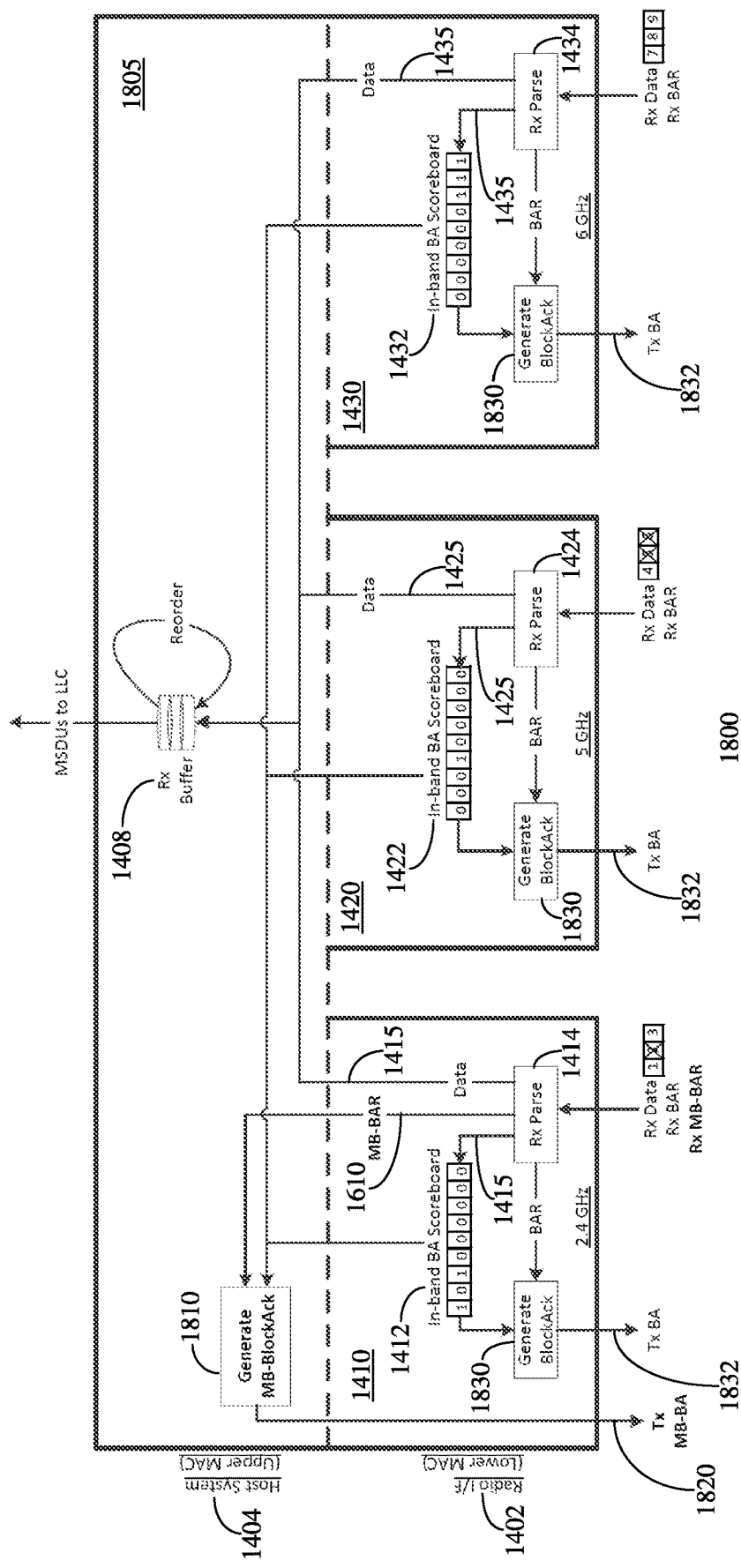
FIG. 18 depicts an illustration of a first variant of the exemplary reference model for Multi-band Block Ack implementation of FIG. 14 in accordance with present embodiments.

FIG. 18 depicts an illustration 1800 of a variant of the exemplary reference model for Multi-band Block Ack implementation of FIG. 14 in accordance with present embodiments. In accordance with the Multi-band Block Ack implementation depicted in the illustration 1800, the separate multi-band BA scorecard 1406 may not be maintained in a host system 1805. Receiving the Multi-band BAR frame on any of the bands triggers the generation 1810 and transmission 1820 of the Multi-band BA and a bitmap of the requested band is copied from the In-band BA Scoreboard of the respective Radio I/F and used to generate 1830 and transmit 1832 the Block Ack(s) for the requested band(s). At the same time, the reception of the multi-band BAR frame 1610 also triggers the upper MAC to reassemble the complete MSDUs from the frames in the Receive Buffer 1408 (all complete MSDUs with SN lower than a Starting Sequence Number (SSN)) and forward them in order to the upper layers. Although in FIG. 18, the reception of the multi-band BAR frame 1610 and the transmission of the multi-band BA frame 1820 are shown in the 2.4 GHz band, it is to be understood that process is the same for the other frequency bands as well.

Figure 19:
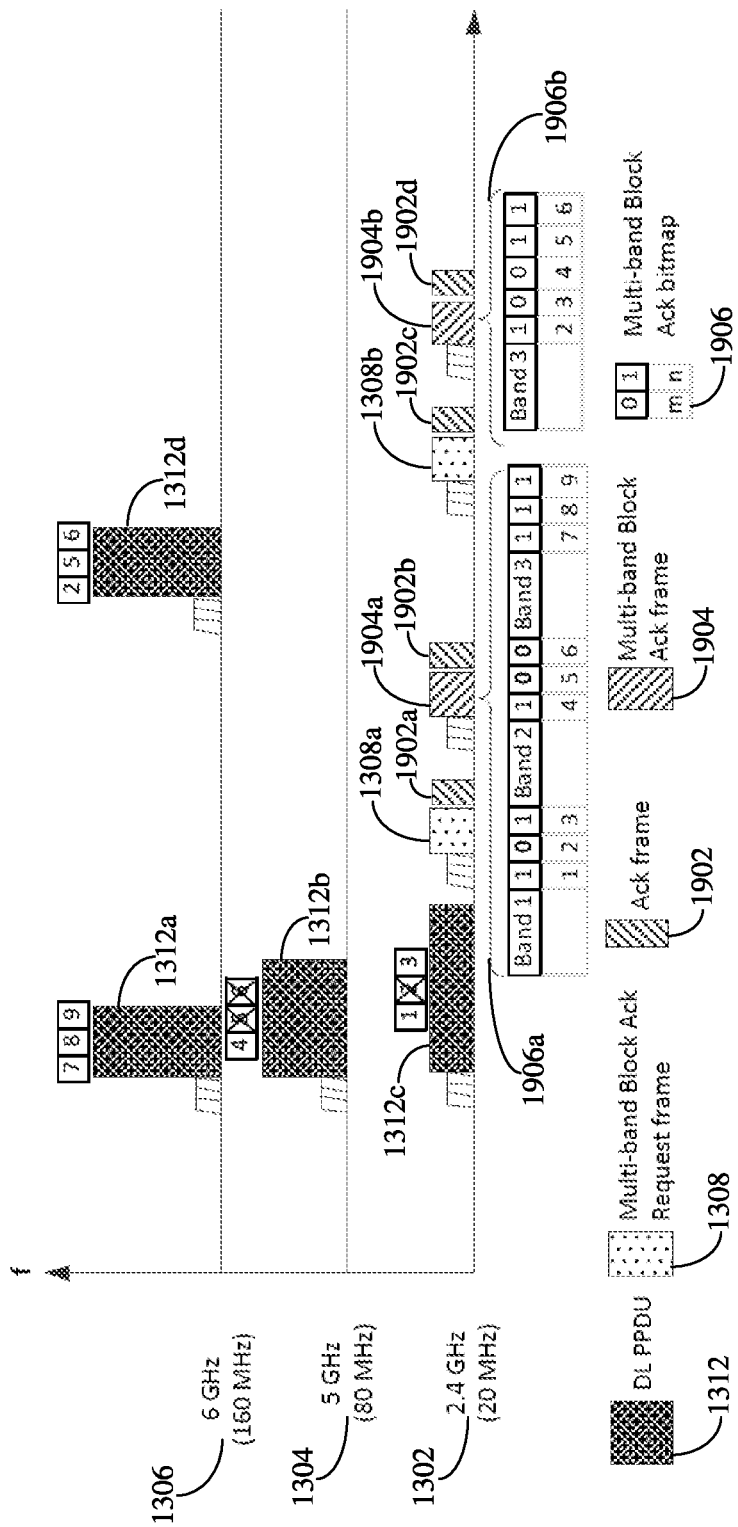
FIG. 19 depicts an illustration of a third exemplary multi-band transmission, a delayed Block Ack scheme, in accordance with the present embodiments.

As the Multi-band BA is generated 1810 without a consolidated bitmap, transmission 1820 of the Multi-band BA may require more time and, therefore, may require a delayed Block Ack scheme. FIG. 19 depicts an illustration 1900 of a third exemplary multi-band transmission, a delayed multi-band Block Ack scheme, in accordance with the present embodiments. In a delayed multi-band Block Ack scheme, Ack frames 1902*a*, 1902*c* are sent in response to the Multi-band Block Ack Request frames 1308*a*, 1308*b*, and the Multi-band BlockAck frames are not immediately sent upon reception of Multi-band Block Ack Request frames 1308*a*, 1308*b* but may be sent as delayed Delayed BlockAck frames 1904*a*, 1904*b* (followed by Ack frames 1902*b*, 1902*d*) to give the recipient time to copy the band specific BA bitmaps from the Radio I/Fs of the respective bands. Thus, the Multi-band BlockAck frames 1904*a*, 1904*b* carry the Block Ack Information 1906*a*, 1906*b* that includes bitmaps specific to each band and the bitmaps are not consolidated.

Figure 20:
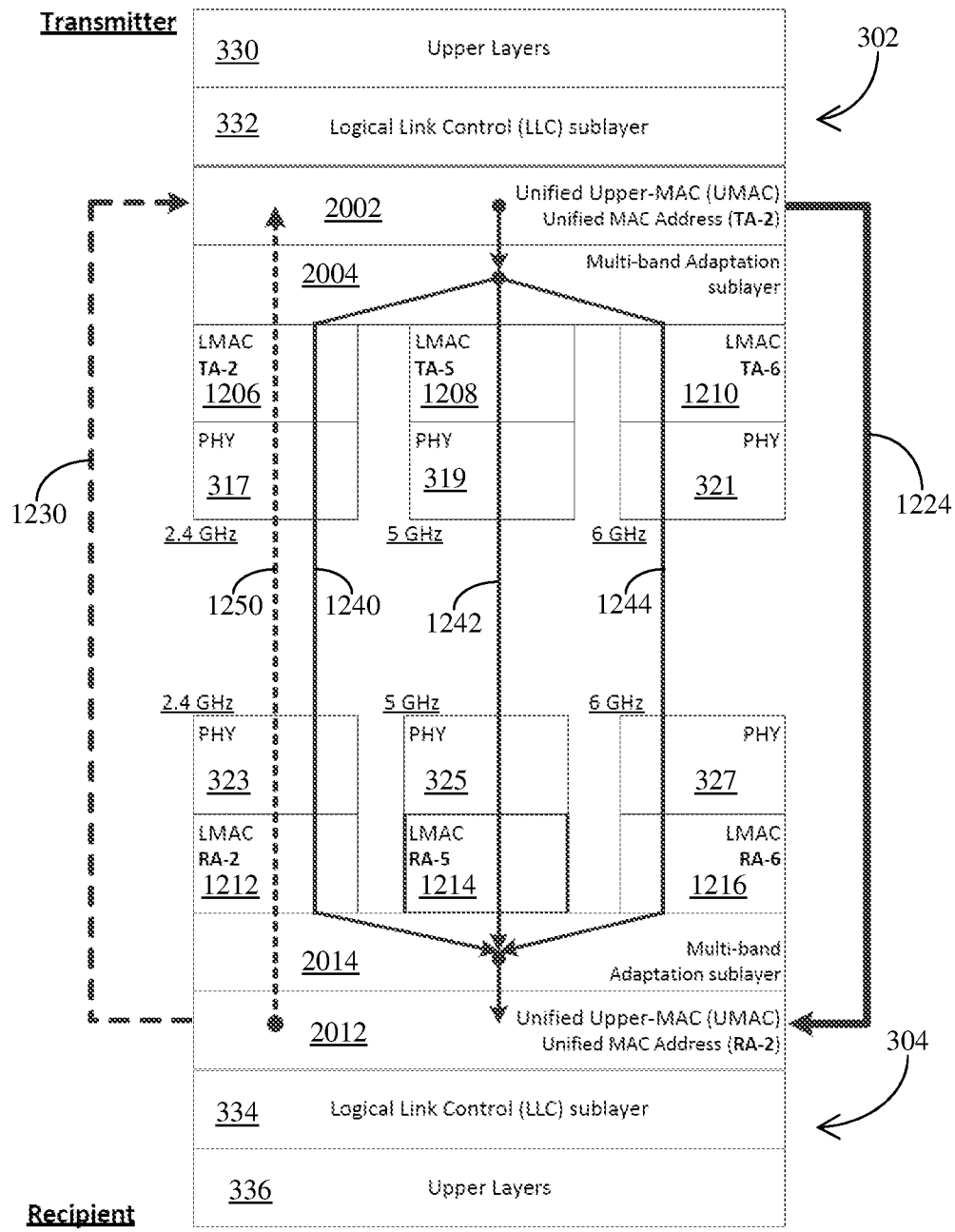
FIG. 20 depicts an illustration of a Traffic Stream and Block Ack architecture purpose defined to take care of Multi-band transmission and Multi-band Block Ack in accordance with present embodiments.

FIG. 20 depicts an illustration 2000 of a Traffic Stream and Block Ack architecture purpose defined to take care of Multi-band transmission and Multi-band Block Ack in accordance with present embodiments. The Multi-band Traffic Stream and Multi-band Block Ack agreement for a TID are setup between the respective Unified MAC addresses of unified Upper MAC layers 2002, 2012 of each device and is band-agnostic and hence much simpler to manage. The Multi-band Traffic Stream and Multi-band Block Ack agreements are identified by the unified MAC addresses and not by the band specific MAC addresses (i.e., the multi-band transmissions are addressed to the Unified MAC Address irrespective of the band used).

At the transmitter 302 side, the unified UMAC layer 2002 passes the Traffic Stream (TS) to a Multi-band Adaption sublayer 2004 which performs multi-band aggregation of the TS data over three TS data paths 1240, 1242, 1244 and makes the decision of which band(s) to use for transmissions as well as re-transmissions. A Multi-band Adaption sublayer 2014 of the recipient 304 is responsible for multi-band de-aggregation (i.e., re-ordering frames belonging to the TS received on the three TS data paths 1240, 1242, 1244) before passing the TS to the recipient Unified Upper MAC layer 2012.

Figure 21:
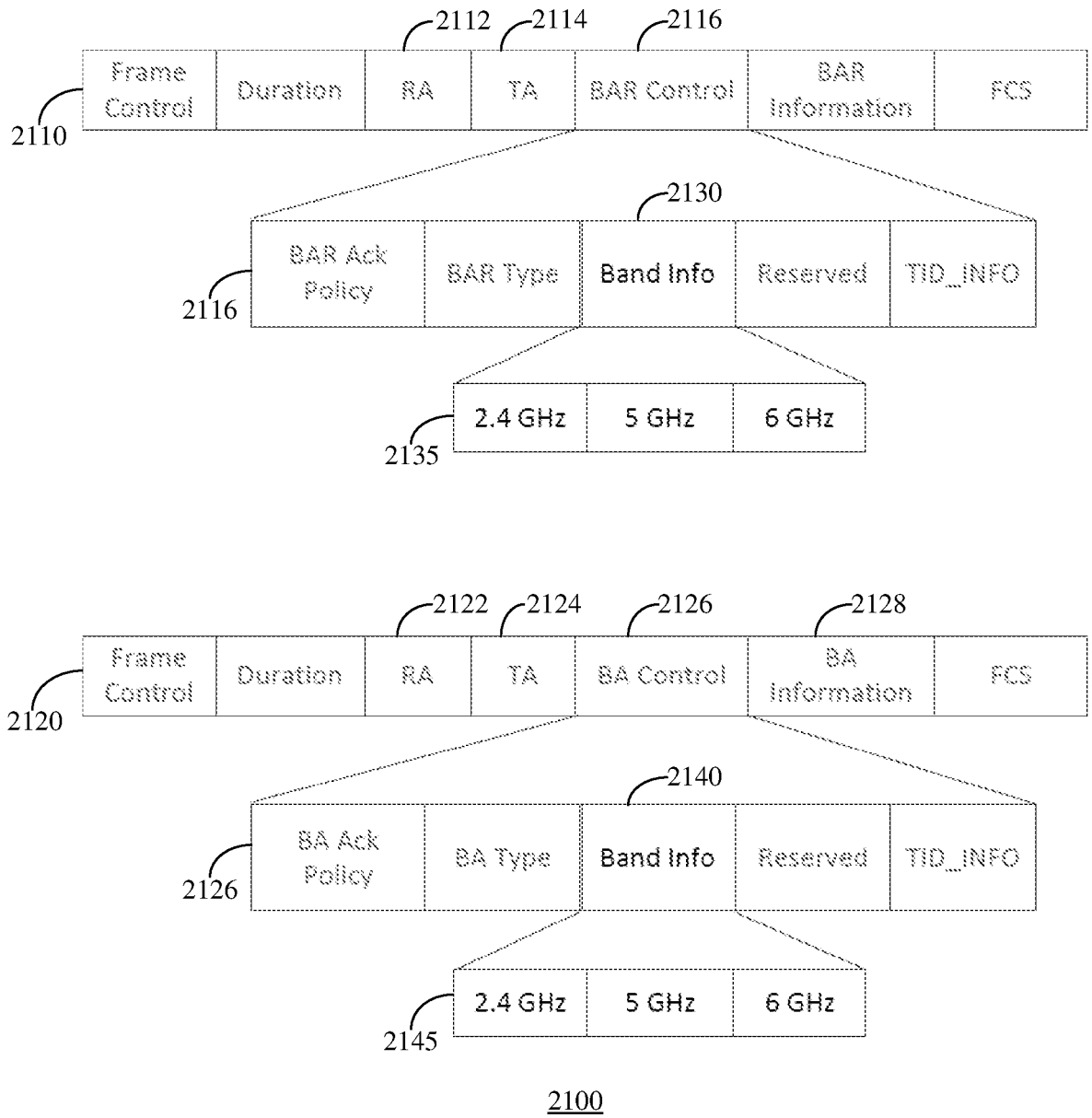
FIG. 21 depicts an illustration of a multi-band BlockAck-Req frame and a multi-band BlockAck frame in accordance with a second variant of the present embodiments.

FIG. 21 depicts an illustration 2100 of a multi-band BlockAckReq frame 2110 and a multi-band BlockAck frame 2120 in accordance with a second variant of the present embodiments. The RA field 2112 and the TA field 2114 of the multi-band BlockAckReq frame 2110 carries the Unified MAC address for the unified Upper MAC layer 2012 irrespective of the band used for transmission of the the multi-band BlockAckReq frame 2110. Likewise, the RA field 2122 and the TA field 2124 of the multi-band BlockAck frame 2120 carries the Unified MAC address for the unified Upper MAC layer 2002 irrespective of the band used for transmission of the multi-band BlockAck frame 2120.

The multi-band BlockAckReq frame 2110 indicates the requested bands 2135 in a Band Info field 2130 of a BlockAck Request Control field 2116. Similarly, the multi-band BlockAck frame 2120 indicates the acknowledged bands 2145 in a Band Info field 2140 of a Block Ack Control field 2126.

Further, a Block Ack Information field 2128 includes a consolidated BlockAck Bitmap across the requested bands if the Band Info field 2116 is not present in the Multi-band BlockAckReq frame 2110 or all the three bands are indicated by the Band Info field 2116 in the Multi-band BlockAckReq frame 2110. Otherwise, Block Ack Information field 2128 includes a BlockAck Bitmap for a specific single band when the single band is indicated in the Band Info field 2116.

Figure 22:
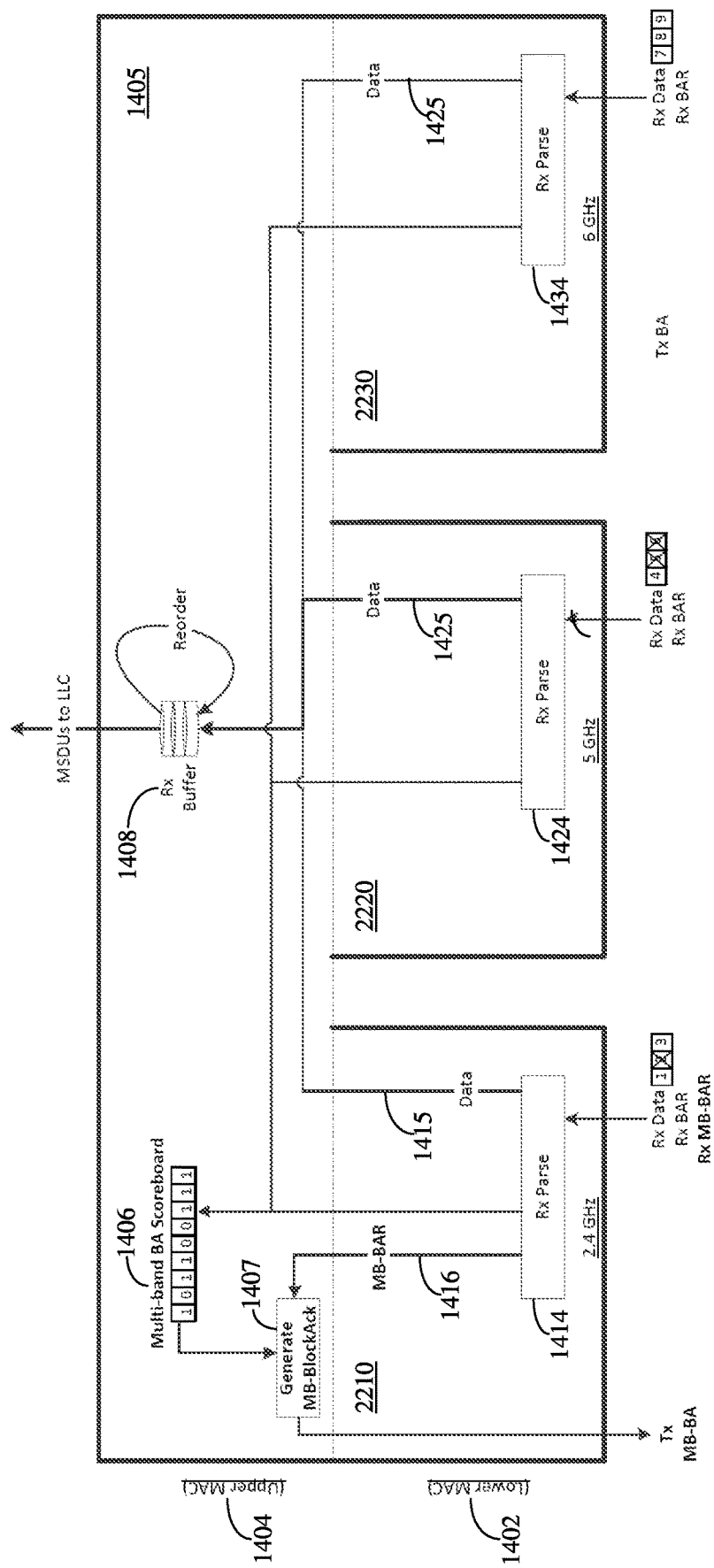
FIG. 22 depicts an illustration of a second variant of the exemplary reference model for Multi-band Block Ack implementation of FIG. 14 in accordance with present embodiments.

FIG. 22 depicts an illustration 2200 of a second variant of the exemplary reference model for Multi-band Block Ack implementation of FIG. 14 in accordance with present embodiments. Due to advancement of semiconductor technology, if multiple radio I/Fs 2210, 2220, 2230 are implemented as a single System On Chip (SOC) or if the connection between the radio I/Fs 2210, 2220, 2230 and the host system 1405 is fast enough, the single consolidated Multi-band BA scoreboard 1406 may be maintained per TID and the In-band BA scorecards 1412, 1422, 1432 (FIG. 4) are not maintained. Separate band specific Scoreboards may also be maintained in the host system 1405 in cache memories to support reporting of band specific Block Acks (for example upon receipt of legacy (single band) BlockAckReq frames, or a multi-band BlockAckReq frame 2110 (FIG. 21) with the Band Info field 2130 indicating a single or two bands. Therefore, reception of frames on any band is directly recorded in the MB BA scoreboard 1406. This second variant of the exemplary reference model for Multi-band Block Ack implementation may help to reduce the on-chip memory requirement for Multi-band Block Ack schemes.

Figure 23:
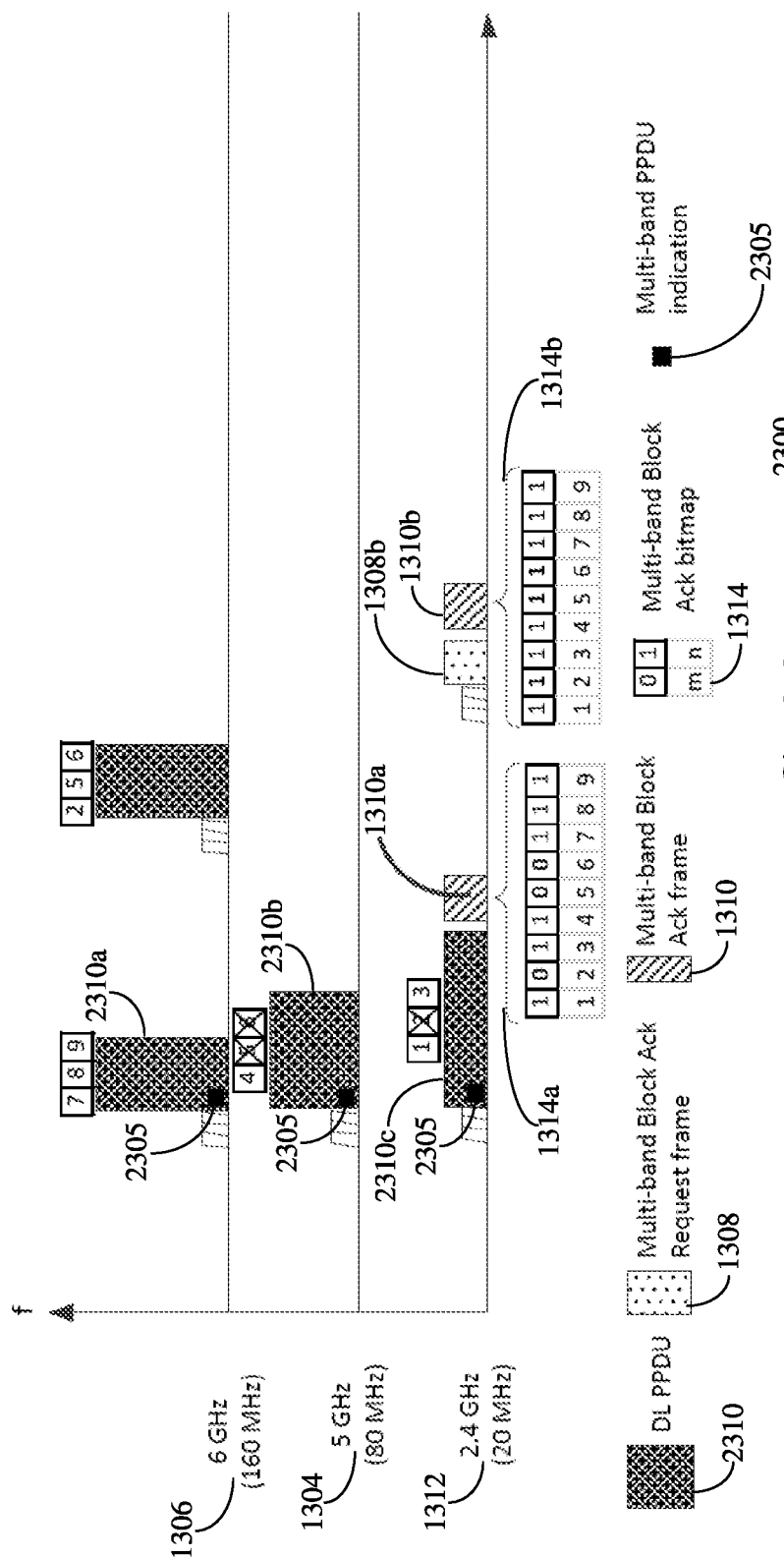
FIG. 23 depicts an illustration of a fourth exemplary multi-band transmission, an implicit Multi-band BlockAck Request scheme, in accordance with present embodiments.

FIG. 23 depicts an illustration 2300 of a fourth exemplary multi-band transmission, an implicit Multi-band BlockAck Request scheme, in accordance with present embodiments. In a multi-band transmission, a PHY Header of the PPDU in each band (e.g., in one of the SIG fields) carries a Multi-band PPDU indication 2305 that this is part of a multi-band PPDU.

For implicit and explicit Multi-band Block Ack requests, Ack policy bits (e.g., Bit 5 and Bit 6) in the QoS Control field (i.e., in a Frame Control field of the MAC Header) may be overloaded with the values "00" and "11" being redefined for frames carried in a multi-band PPDU. As shown in Table 1, the "00" indicates an Implicit Multi-band Block Ack Request (i.e. there will be no Block Ack Request frame and the recipient is expected to transmit the Multi-band Block Ack immediately); and "3" (i.e., "11") indicates an Explicit Multi-band Block Ack Request (i.e. an explicit Multi-band Block Ack Request or an implicit Multi-band Block Ack Request is to be expected in future in the same band or any other band).

TABLE 1

Bits in QoS Control field

| Bit 5 | Bit 6 | Meaning |
| --- | --- | --- |
| 0 | 0 | Implicit Multi-band Block Ack Request. Addressed receipient returns a multi-band BlockAck frame starting SIFS after the PPDU carrying the frame. |
| 1 | 0 | No Ack |
| 0 | 1 | No explicit acknowledgemt or PSMP Ack or Triggered Ack (11ax). |
| 1 | 1 | Explicit Multi-band Block Ack Request. Receeipient can expect a Multi-band BlockAckReq frame or implicit block ack request in the future on any of the active bands. |

For example, the Multi-band PPDU indication 2305 is set in the DL PPDUs 2310a, 2310b and 2310c to indicate that the three PPDUs are part of a multi-band DL transmission. The bit 5 and bit 6 of the QoS Control field of the PPDU 2310a and PPDU 2310b are set to "1" and "1" indicating explicit Multi-band Block Ack Request where the recipient can expect a Multi-band BlockAckReq frame or implicit Block Ack request in the future, as such the recipient need not transmit a BlockAck frame on band 1306 and band 1304. The bit 5 and bit 6 of the QoS Control field of the PPDU 2310c are set to "0" and "0" indicating Implicit Multi-band Block Ack Request where the recipient is expected to transmit the Multi-band Block Ack immediately without waiting for a Block Ack Request frame. Accordingly, the Multi-band Block Ack 1310a, carrying a multi-band BA bitmap 1314a acknowledging the frames received on all three bands, is transmitted by the recipient within a Short Interframe Space (SIFS) after the end of PPDU 2310c without waiting for a Multi-band Block Ack Request frame.

Figure 24:
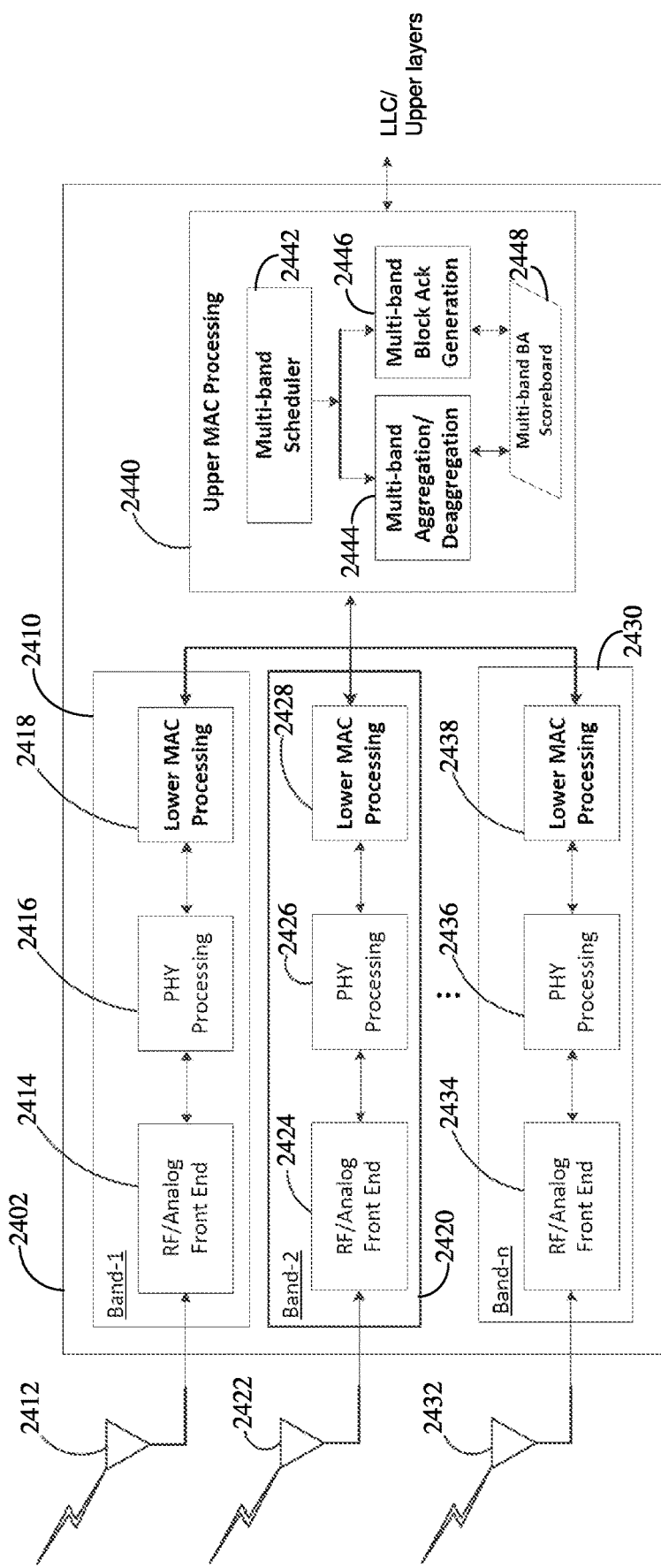
FIG. 24 depicts a simplified block diagram of a multi-band communication device in accordance with the present embodiments.

FIG. 24 depicts a simplified block diagram 2400 of a multi-band communication device 2402 (for example the AP 102 or the STA 104 (FIG. 1)) in accordance with the present embodiments and can serve as either a transmitter 302 or a recipient 304 or both at the same time. Of course, the AP 102 may have concurrent TS and BA sessions with multiple non-AP STAs 104 (see FIG. 1) and as such will be more complicated, while non-AP STAs 104 have TS and BA sessions only with the AP 102.

The multi-band communication device 2402 includes a plurality of transceivers 2410, 2420, 2430 which, in transmitter operation, each transmit signal frames on different ones of a plurality of frequency bands from respective antennas 2412, 2422, 2432 and, in recipient operation, each receive signal frames on different ones of a plurality of frequency bands via respective antennas 2412, 2422, 2432. Each of the transceivers 2410, 2420, 2430 include a RF/Analog Front End 2414, 2424, 2434 coupled at one end to a respective one of the antennas 2412, 2422, 2432 and coupled at the other end to a respective one of a Physical layer (PHY) processing modules 2416, 2426, 2436. Each of the PHY processing modules 2416, 2426, 2436 are additionally coupled to a respective one of a Lower MAC processing module 2418, 2428, 2438.

The data paths from the plurality of transceivers 2410, 2420, 2430 couple to Upper MAC circuitry 2440. The Upper MAC circuitry 2440 (or Upper MAC Processing layer) includes a Multi-Band Scheduler 2442, a Multi-Band Aggregation/De-aggregation block 2444, a Multi-Band Block Ack Generation block 2446 and a Multi-band Block Ack scoreboard block 2448. The Multi-Band Block Ack Generation block 2446 and the Multi-band Block Ack scoreboard block 2448 are only used when the multi-band communication device 2402 is operating as a recipient. When operating as a transmitter, the Multi-Band Scheduler 2442 keeps track of the status/capabilities of the different bands at the recipient STA, sets up multi-band TS s and multi-band Bas, and decides the bands to be used for transmission/re-transmissions of Multi-band Block Acks and the bands to be used for Multi-band Block Ack Requests. When operating as a transmitter, the Multi-Band Aggregation/De-aggregation block 2444 aggregates the traffic stream over the selected band(s) and, when operating as a recipient, de-aggregates the traffic streams coming from the different bands into a single stream. When operating as a recipient, the Multi-Band Aggregation/De-aggregation block 2444 also updates the Multi-band Block Ack scoreboard block 2448. When operating as a recipient, the Multi-Band Block Ack Generation block 2446 is coupled to the Multi-Band Scheduler 2442 and the Multi-band Block Ack scoreboard block 2448 and generates Multi-band Block Ack.

Figure 25:
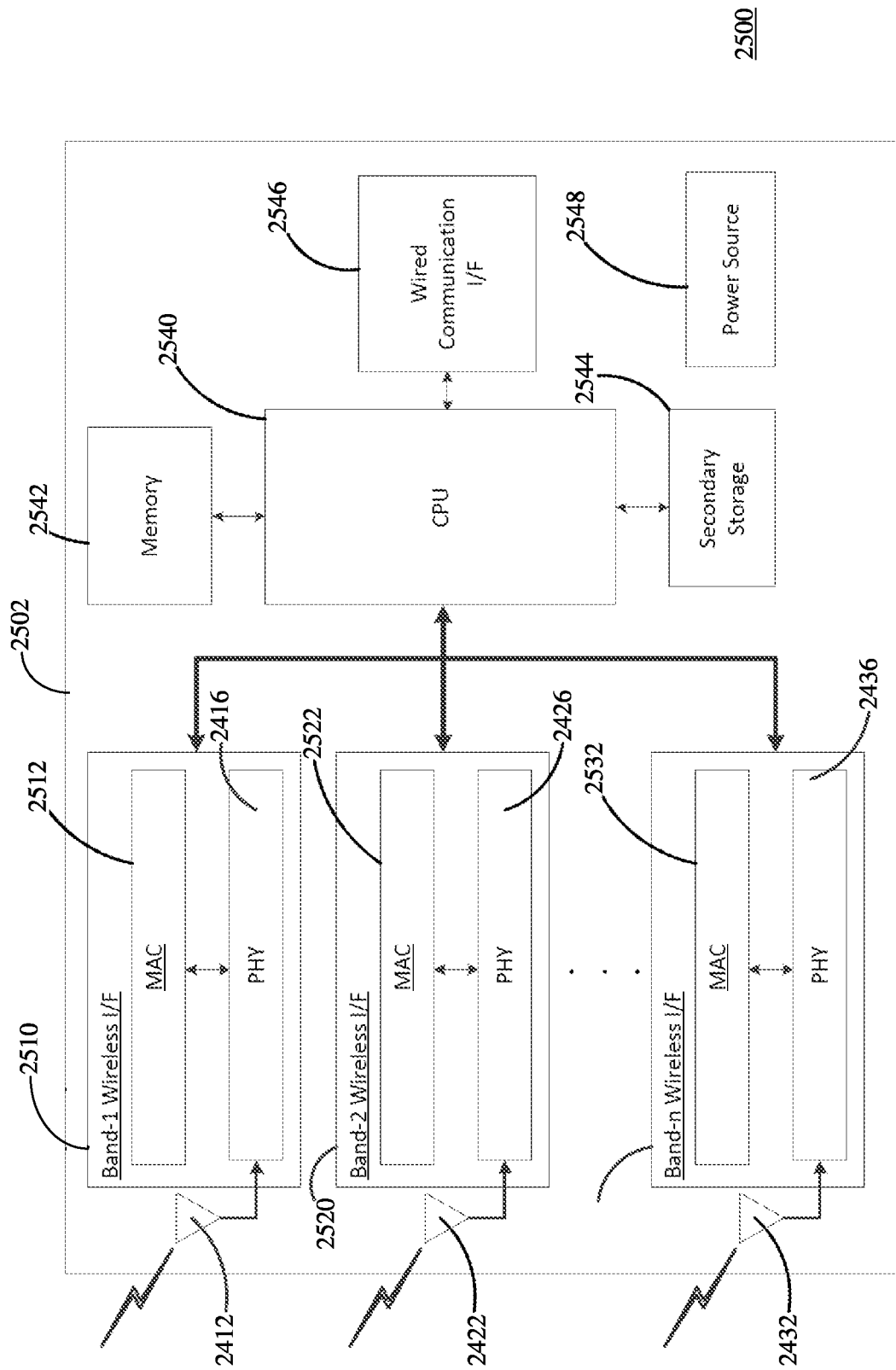
FIG. 25 depicts a detailed block diagram of a multi-band communication device in accordance with the present embodiments.

FIG. 25 depicts a detailed block diagram 2500 of a multi-band communication device 2502 in accordance with the present embodiments. Each of a plurality of Wireless I/Fs 2510, 2520, 2530 implement both a respective one of the Physical layer (PHY) processing modules 2416, 2426, 2436 and a respective one of Lower MAC function modules 2512, 2522, 2532. The Upper MAC functions may be implemented as software within a central processing unit (CPU) 2540 which, in operation, may be coupled to a memory 2542 that may be used to store the multi-band BA scoreboard, a secondary storage 2544 and a wired communication I/F 2546 for communicating with external networks or with other APs 102. A power source 2548 provides power for the AP 2502.

The present disclosure can be realized by any kind of apparatus, device or system having a function of communication, which is referred as a communication device.

The communication device may comprise a transceiver and processing/control circuitry. The transceiver may comprise and/or function as a receiver and a transmitter. The transceiver, as the transmitter and receiver, may include an RF (radio frequency) module including amplifiers, RF modulators/demodulators and the like, and one or more antennas.

Some non-limiting examples of such communication device include a phone (e.g., cellular (cell) phone, smart phone), a tablet, a personal computer (PC) (e.g., laptop, desktop, netbook), a camera (e.g., digital still/video camera), a digital player (digital audio/video player), a wearable device (e.g., wearable camera, smart watch, tracking device), a game console, a digital book reader, a telehealth/telemedicine (remote health and medicine) device, and a vehicle providing communication functionality (e.g., automotive, airplane, ship), and various combinations thereof.

The communication device is not limited to be portable or movable, and may also include any kind of apparatus, device or system being non-portable or stationary, such as a smart home device (e.g., an appliance, lighting, smart meter, control panel), a vending machine, and any other "things" in a network of an "Internet of Things (IoT)".

The communication may include exchanging data through, for example, a cellular system, a wireless LAN system, a satellite system, etc., and various combinations thereof.

The communication device may comprise an apparatus such as a controller or a sensor which is coupled to a communication apparatus performing a function of communication described in the present disclosure. For example, the communication device may comprise a controller or a sensor that generates control signals or data signals which are used by a communication apparatus performing a communication function of the communication device.

The communication device also may include an infrastructure facility, such as a base station, an access point, and any other apparatus, device or system that communicates with or controls apparatuses such as those in the above non-limiting examples.

Thus, it can be seen that the present embodiments provide communication devices and methods for operation over multiple frequency bands in order to fully realize the throughput gains of multi-band aggregation.

1. A multi-band communication device comprising a plurality of transceivers which, in operation, each transmit signal frames on different ones of a plurality of frequency bands; and Media Access Control (MAC) circuitry coupled to the plurality of transceivers which, in operation, receives a multi-band block acknowledgement frame on one of the plurality of frequency bands acknowledging the signal frames transmitted on the plurality of frequency bands.

2. The multi-band communication device wherein the MAC circuitry, in operation, generates a multi-band block acknowledgement request frame and transmits the MAC multi-band block acknowledgement request frame on the one of the plurality of frequency bands to solicit the multi-band block acknowledgement frame.

3. The multi-band communication device wherein the transmitted signal frames on the plurality of frequency bands all belong to a single traffic identifier (TID).

4. The multi-band communication device wherein the multi-band block acknowledgement frame is implicitly solicited in any one of the transmitted signal frames.

5. The multi-band communication device wherein, in response to the MAC circuitry determining failure of reception of one or more signal frames on a first of the plurality of frequency bands, the MAC circuitry providing the one or more signal frames to one of the plurality of transceivers which transmits signal frames on a second of the plurality of frequency bands different from the first of the plurality of frequency bands to retransmit the one or more signal frames on the second of the plurality of frequency bands.

6. The multi-band communication device wherein the one or more signal frames retransmitted on the second of the plurality of frequency bands is transmitted in a same format as the one or more signals transmitted on the first of the plurality of frequency bands.

7. The multi-band communication device wherein the retransmitted one or more signal frames are retransmitted as a hybrid automatic repeat request (HARQ) retransmission.

8. The multi-band communication device wherein the MAC circuitry, in operation, performs setup of a multi-band Traffic Streams (TS) on the plurality of frequency bands by exchanging a multi-band Add Traffic Stream (ADDTS) Request frame and a multi-band ADDTS Response frame on one of the frequency bands.

9. The multi-band communication device wherein the multi-band ADDTS Request frame and the multi-band ADDTS Response frame each include information on the plurality of frequency bands for the multi-band TS and MAC addresses used by the circuitry in each of the plurality of frequency bands.

10. The multi-band communication device of claim 8 wherein the multi-band TS setup allows transmission of signal frames belonging to a Traffic Stream (TS) on any of the frequency bands.

The multi-band communication device wherein the two or more of the plurality of frequency bands comprises all of the plurality of frequency bands.

The multi-band communication device wherein the plurality of frequency bands are all frequency bands above 2 GHz.

11. A method for multi-band communication comprising transmitting signal frames on different ones of a plurality of frequency bands; and receiving a multi-band block acknowledgement frame on one of the plurality of frequency bands.

12. A multi-band communication device comprising a plurality of transceivers which, in operation, each receive signal frames on different ones of a plurality of frequency bands; and MAC circuitry coupled to the plurality of transceivers which, in operation, generates and transmits a multi-band block acknowledgement frame on one of the plurality of frequency bands acknowledging the signal frames received on the plurality of frequency bands.

13. The multi-band communication device wherein the MAC circuitry, in operation, transmits the multi-band block acknowledgement frame in response to receiving a multi-band block acknowledgement request frame on the one of the plurality of frequency bands.

14. The multi-band communication device wherein the multi-band block acknowledgement frame includes a consolidated bitmap acknowledging signal frames received on the plurality of frequency bands.

15. The multi-band communication device wherein the multi-band block acknowledgement frame transmitted on one of the plurality of frequency bands includes bitmaps acknowledging signal frames received on each of the plurality of frequency bands.

16. The multi-band communication device wherein the multi-band block acknowledgement frame transmitted on one of the plurality of frequency bands includes a bitmap acknowledging signal frames received on another one of the plurality of frequency bands.

17. The multi-band communication device wherein the MAC circuitry, in operation, initiates setup of a multi-band Block Acknowledgement (BA) on the plurality of frequency bands by transmitting a multi-band ADDBA Request frame on one of the frequency bands and, thereafter, receiving a multi-band ADDBA response frame on the one of the frequency bands.

18. The multi-band communication device wherein the multi-band ADDBA Request frame and the multi-band ADDBA Response frame each include information on the plurality of frequency bands for the multi-band BA agreement and MAC addresses used by the circuitry in each of the plurality of frequency bands.

The multi-band communication device wherein the two or more of the plurality of frequency bands comprises all of the plurality of frequency bands.

The multi-band communication device wherein the plurality of frequency bands are all frequency bands above 2 GHz.

19. A method for multi-band communication comprising receiving signal frames on different ones of a plurality of frequency bands; and transmitting a multi-band block acknowledgement frame on one of the plurality of frequency bands acknowledging the signal frames received on the plurality of frequency bands.

While exemplary embodiments have been presented in the foregoing detailed description of the present embodiments, it should be appreciated that a vast number of variations exist. It should further be appreciated that the exemplary embodiments are examples, and are not intended to limit the scope, applicability, operation, or configuration of this disclosure in any way. Rather, the foregoing detailed description will provide those skilled in the art with a convenient road map for implementing exemplary embodiments, it being understood that various changes may be made in the function and arrangement of steps and method of operation described in the exemplary embodiments and modules and structures of devices described in the exemplary embodiments without departing from the scope of the subject matter as set forth in the appended claims.

What is claimed is:

1. A multi-band transmitter device comprising:
control circuitry which, using a single frequency band, establishes a multi-band Block Ack agreement for a single Traffic Identifier (TID) between a transmitter's unified MAC address of the multi-band transmitter device and a recipient's unified MAC address of a multi-band recipient device, the multi-band Block Ack agreement being identified by the single TID, the recipient's unified MAC address, and the transmitter's unified MAC address;
a transmitter which, in operation, transmits to the multi-band recipient device, over a plurality of frequency bands, a plurality of MAC layer Protocol Data Units (MPDUs) belonging to the single TID;
wherein the transmitter, in operation, transmits a multi-band Block Ack request frame including a Multi-Band field that indicates a request for a Block Ack for multiple bands; and
a receiver which, based on the multi-band Block Ack agreement, receives on a first frequency band a multi-band block ack frame indicating reception statuses of the plurality of MPDUs transmitted over the plurality of frequency bands,
wherein the receiver, in operation, additionally receives a per-band block ack frame indicating a reception status of a subset of the plurality of MPDUs, the subset being transmitted on one frequency band among the plurality of frequency bands, and
wherein the per-band block ack frame is generated by the multi-band recipient device with partial state operation on each of the plurality of frequency bands.

2. The multi-band transmitter device of claim 1, wherein the multi-band Block Ack agreement is established for the single TID by exchanging an Add Block Ack (ADDBA) Request frame and an Add Block Ack (ADDBA) Response frame on an enabled frequency band.

3. The multi-band transmitter device of claim 1, wherein the plurality of MPDUs are transmitted on any of the plurality of frequency bands to which the single TID is mapped.

4. The multi-band transmitter device of claim 1, wherein, in response to receiving the multi-band block ack frame that indicates failure of reception of a first MPDU transmitted on the first frequency band, the transmitter retransmits the first MPDU on a second frequency band different from the first frequency band.

5. The multi-band transmitter device of claim 1, wherein the multi-band Block Ack request frame further includes one or more per-band information fields, each of the one or more per-band information fields comprising a TID field for indicating the single TID for which the multi-band block ack response is requested.

6. The multi-band transmitter device of claim 1, wherein a single reordering buffer is maintained for each set of the transmitter's unified MAC address of the multi-band transmitter device and the single TID.

7. The multi-band transmitter device of claim 1, wherein the control circuitry, in operation, using the single frequency band, performs a multi-band association setup for simultaneous communication on the plurality of frequency bands with the multi-band recipient device.

8. The multi-band transmitter device of claim 1, wherein
the control circuitry, in operation, consolidates the reception statuses of the subset and the reception statuses of the plurality of MPDUs to determine which of the plurality of MPDUs needs retransmission.

9. A communication method for a multi-band transmitter device, the communication method comprising:
using a single frequency band, establishing a multi-band Block Ack agreement for a single Traffic identifier (TID) between a transmitter's unified MAC address of the multi-band transmitter device and a recipient's unified MAC address of a multi-band recipient device, the multi-band Block Ack agreement being identified by the single TID, the recipient's unified MAC address, and the transmitter's unified MAC address;
transmitting to the multi-band recipient device, over a plurality of frequency bands, a plurality of MAC layer Protocol Data Units (MPDUs) belonging to the single TID;
transmitting a multi-band Block Ack request frame including a Multi-Band field that indicates a request for a Block Ack for multiple bands;
based on the multi-band Block Ack agreement, receiving on a first frequency band a multi-band block ack frame indicating reception statuses of the plurality of MPDUs transmitted over the plurality of frequency bands; and
receiving a per-band block ack frame indicating a reception status of a subset of the plurality of MPDUs, the subset being transmitted on one frequency band among the plurality of frequency bands,
wherein the per-band block ack frame is generated by the multi-band recipient device with partial state operation on each of the plurality of frequency bands.

10. The communication method of claim 9, wherein the multi-band Block Ack agreement is established for the single TID by exchanging an Add Block Ack (ADDBA) Request frame and an Add Block Ack (ADDBA) Response frame on an enabled frequency band.

11. The communication method of claim 9, wherein the plurality of MPDUs are transmitted on any of the plurality of frequency bands to which the single TID is mapped.

12. The communication method of claim 9, comprising:
in response to receiving the multi-band block ack frame that indicates failure of reception of a first MPDU transmitted on the first frequency band, retransmitting the first MPDU on a second frequency band different from the first frequency band.

13. The multi-band communication method of claim 9, wherein:
   the multi-band Block Ack request frame further includes one or more per-band information fields, each of the one or more per-band information fields comprising a TID field for indicating the single TID for which the multi-band block ack response is requested.

14. The multi-band communication method of claim 9, wherein a single reordering buffer is maintained for each set of the transmitter's unified MAC address of the multi-band transmitter device and the single TID.

15. The multi-band communication method of claim 9, comprising:
   using the single frequency band, performing a multi-band association setup for simultaneous communication on the plurality of frequency bands with the multi-band recipient device.

16. The multi-band communication method of claim 9, comprising:
   consolidating the reception statuses of the subset and the reception statuses of the plurality of MPDUs to determine which of the plurality of MPDUs needs retransmission.

\* \* \* \* \*